United States Patent
Wada

(10) Patent No.: US 7,359,425 B2
(45) Date of Patent: Apr. 15, 2008

(54) ULTRA-WIDEBAND TRANSMITTER AND RECEIVER, AND ULTRA-WIDEBAND WIRELESS COMMUNICATION METHOD

(75) Inventor: Yoshio Wada, Yokohama (JP)

(73) Assignee: Samsung Electronics Co., Ltd. (KR)

( * ) Notice: Subject to any disclaimer, the term of this patent is extended or adjusted under 35 U.S.C. 154(b) by 929 days.

(21) Appl. No.: 10/658,618

(22) Filed: Sep. 9, 2003

(65) Prior Publication Data
US 2004/0087291 A1   May 6, 2004

(30) Foreign Application Priority Data
Sep. 9, 2002   (JP) .............................. 2002-262680

(51) Int. Cl.
*H04B 1/69* (2006.01)
(52) U.S. Cl. ...................... 375/130; 375/143; 375/152
(58) Field of Classification Search ................ 375/152, 375/130, 143, 146, 147, 343; 455/552.1
See application file for complete search history.

(56) References Cited

U.S. PATENT DOCUMENTS

2006/0234761 A1* 10/2006 Nagasaka ................. 455/552.1

2007/0104258 A1* 5/2007 Sugiura et al. ............. 375/152

* cited by examiner

*Primary Examiner*—Don N. Vo
(74) *Attorney, Agent, or Firm*—The Farrell Law Firm, P.C.

(57) ABSTRACT

An ultra-wideband transmitter and receiver, and a ultra-wideband wireless communication method, which perform ultra-wideband wireless communication by a low-speed digital circuit having a low power consumption and controlling the effect of a multi-pass. In ultra-wideband transmitter, delay time controller generates and inputs a periodic pulse to a first matched filter, outputs the periodic pulse to a second matched filter when data to be transmitted are at a first level of a binary logic level, and outputs the periodic pulse to a third matched filter when the data to be transmitted are at a second level of the binary logic level. The first matched filter receives the periodic pulse from the delay time controller and outputs a reference signal for data determination the second matched filter receives the periodic pulse from the delay time controller and outputs a first data signal earlier than the reference signal by a predetermined time. The third matched filter receives the periodic pulse from the delay time controller and for outputs a second data signal later than the reference signal by a predetermined time. An adder adds outputs of the first, second, and third matched filters to each other and outputs an added signal, and an antenna section receives the added signal from the adder and radiates the received added signal into the air.

16 Claims, 36 Drawing Sheets

| Q1 | Q2 | DATA |
|----|----|------|
| 0  | 0  | X    |
| 0  | 1  | 1    |
| 1  | 0  | 0    |
| 1  | 1  | X    |

FIG.15

| Q10 | Q11 | Q12 | Q13 | Q14 | DATA |
|-----|-----|-----|-----|-----|------|
| 1 | 0 | 1 | 1 | 1 | 0,0 |
| 1 | 0 | 0 | 1 | 1 | 0,1 |
| 1 | 0 | 0 | 0 | 1 | 1,1 |
| 1 | 0 | 0 | 0 | 0 | 1,1 |

FIG.26

| Qn0 | Qn1 | Qn2 | Qn3 | Qn4 | DATA |
|---|---|---|---|---|---|
| 1 | 0 | 1 | 1 | 1 | 0,0,i |
| 1 | 0 | 0 | 1 | 1 | 0,1,i |
| 1 | 0 | 0 | 0 | 1 | 1,1,i |
| 1 | 0 | 0 | 0 | 0 | 1,1,i | i = n-2

FIG.31

ULTRA-WIDEBAND TRANSMITTER AND RECEIVER, AND ULTRA-WIDEBAND WIRELESS COMMUNICATION METHOD

PRIORITY

This application claims priority to an application entitled "ULTRA WIDEBAND WIRELESS TRANSMITTER AND RECEIVER, AND ULTRA-WIDEBAND WIRELESS COMMUNICATION METHOD" filed in the Japanese Industrial Property Office on Sep. 9, 2002 and assigned Ser. No. 2002-262680, the contents of which are hereby incorporated by reference.

BACKGROUND OF THE INVENTION

1. Field of the Invention

The present invention relates to an ultra-wideband transmitter and receiver, and an ultra-wideband wireless communicating method using ultra-wideband.

2. Description of the Related Art

An ultra-wideband wireless communication system has been developed as a new type of data communication system in a spread spectrum communication system. The ultra-wideband wireless communication system performs data communication by spreading data to ultra wide frequency band of about 1 GHz and overlapping the spread data with a pulse without using a carrier wave. Because data transmitted with each frequency band has only intensity of noise magnitude in the ultra-wideband wireless communication system, wireless devices using the same frequency band interfere with each other and power consumption is low.

Ultra-wideband wireless communication system uses a repeated code, which transmits a predetermined number of impulses with respect to each bit. FIG. 32 illustrates an example of a time format of a signal exchange in the conventional ultra-wideband wireless transceiver. Time axis is divided into a plurality of sections in such a manner that it has one section for every time period T. Reference time is shown by a dotted line in FIG. 32. The conventional ultra-wideband wireless transceiver transmits respective pulses generated at intervals of pseudo random times T1, T2, T3, and T4 from the reference time.

FIG. 33 is an enlarged view of a pulse generated at an interval of the pseudo random time T1 from the reference time. When a transmitter transmits data 1, it transmits a pulse at pseudo random time T1. When the transmitter transmits data 0, it transmits the pulse at time T1+TS. TS is a previously determined time.

FIG. 34 illustrates a relationship between data and a signal waveform. As illustrated in FIG. 34, when a receiver receives a pulse generated at an interval of the pseudo random time T1 from the reference time, it demodulates data 1. When the receiver receives a pulse generated at an interval of time T1+TS from the reference time, it demodulates data 0.

FIG. 35 is a block diagram showing a configuration of a demodulating circuit, which performs a data demodulation in a receiver. FIG. 36 is a view illustrating a waveform of a reference signal. The demodulating circuit generates the reference signal illustrated in FIG. 36 at a predetermined time. That is, the demodulating circuit generates a positive pulse at time T1 and generates a negative pulse at time TS. A multiplier of the demodulating circuit multiplies a received signal by the reference signal.

FIG. 37 is a waveform illustrating a multiplication result signal of the received signal and the reference signal when the demodulating circuit demodulates data 1. As illustrated in FIG. 37, when a positive pulse is generated, the demodulating circuit demodulates data 1.

FIG. 38 is a waveform illustrating a multiplication result signal of the received signal and the reference signal when the demodulating circuit demodulates data 0. As illustrated in FIG. 38, when a negative pulse is generated, the demodulating circuit demodulates data 0. Generally, when performing a data communication while adding a signal to only an impulse having logic 1, because the pulse is affected by a noise, reliance of data is reduced. In order to prevent that, a plurality of pulses are added thereto.

FIG. 39 is a view illustrating a configuration of a receiver when a plurality of pulses are added. A transmitter transmits a pulse at pseudo random times T1, T2, T3, and T4 illustrated in FIG. 39.

FIG. 40 is a view illustrating a waveform of a reference signal. A receiver multiplies a received signal by the reference signal illustrated in FIG. 40 using the reference signal and outputs a multiplied result signal. An adder accumulates the multiplied result signal from the receiver and outputs it to a determining section.

FIG. 41 is a view illustrating a time change of an output value when data is data 1. When the data is data 1, when time lapses, because an adder sequentially adds the multiplied results to a reference signal at time periods T1, T2, T3, and T4, the outputs are increased.

FIG. 42 is a view illustrating a time change of an output value when data is data 0. When the data is data 0, when time lapses, because the adder sequentially adds the multiplied results to the reference signal at time periods T1, T2, T3, and T4, the outputs are reduced. An average of the outputs is compared with a threshold value and data is determined according to the compared result.

According to the above-described operation, a demodulation of data is performed.

When determining a signal using the conventional ultra-wideband wireless communication system, following problems occur. First, a transmitter needs to generate exact pseudo random times of T1, T2, T3, and T4. For example, when a clock period of 5 GHz is used, a counter of a digital circuit operating at 5 GHz is required. Operating the counter increases power consumption.

When the transmitter generates the signal at an exact time, the receiver needs to exactly estimate a time format by any method in order to prevent a wave performance from being deteriorated. The deterioration of the wave performance occurs due to a bad estimation of the signal format having a period T. Furthermore, the conventional ultra-wideband wireless communication system cannot eliminate multi-pass.

FIG. 43 is a view illustrating a transmitting status of signals when a multiple pass occurs. When a transmitter transmits two signals to a receiver through two wave paths, a delay difference Td occurs between two signals due to a difference of the two wave paths. For example, when a delay time Td between a directly received signal and a signal reflected and received from an object such as an interior wall is 0.2 nsec, a difference of wave paths is 6 cm. In a closed space such as an interior of a room, a multiple pass frequently occurs due to a difference of wave paths.

FIG. 44 is a view illustrating a received signal when a multi-pass occurs in data 1, and FIG. 45 is a view illustrating an output of a multiplier when a multi-pass occurs. As illustrated in FIG. 45, a multiplier multiplies the received signal by the reference signal, because areas of positive and negative values of the multiplied result signal are identical with each other, an output of the adder becomes zero. For this reason, it is incorrectly determined that there is no data, and data 1 cannot be demodulated.

SUMMARY OF THE INVENTION

Accordingly, the present invention has been designed to solve the above and other problems occurring in the prior art, and an object of the present invention is to provide a ultra-wideband transmitter and receiver, and a ultra-wideband wireless communication method, which perform ultra-wideband wireless communication by a low-speed digital circuit having a low power consumption and controlling an effect of a multi-pass.

In order to accomplish the above and other objects, there is provided a wireless ultra wide band transmitter comprising: a delay time controller for generating and inputting a periodic pulse to a first matched filter, outputting the periodic pulse to a second matched filter when data to be transmitted are at a first level of a binary logic level, and outputting the periodic pulse to a third matched filter when the data to be transmitted are at a second level of the binary logic level; the first matched filter for receiving the periodic pulse from the delay time controller and for outputting a reference signal for data determination; the second matched filter for receiving the periodic pulse from the delay time controller and for outputting a first data signal earlier than the reference signal by a predetermined time; the third matched filter for receiving the periodic pulse from the delay time controller and for outputting a second data signal later than the reference signal by a predetermined time; an adder for adding outputs of the first, second, and third matched filters to each other and outputting an added signal; and an antenna section for receiving the added signal from the adder and radiating the received added signal into the air.

Preferably, the reference signal, the first data signal, and the second data signal are pattern signals formed by a plurality of periodic pulses.

More preferably, the ultra-wideband transmitter further comprises an amplifier for receiving and amplifying the added signal from the adder and outputting the amplified signal to the antenna section.

In accordance with another aspect of the present invention, there is provided an ultra-wideband wireless receiver comprising: an antenna section for receiving and outputting an electronic wave signal to first and second matched filters; the first matched filter for receiving the electronic wave signal from the antenna section and outputting a first output signal when the first matched filter detects a reference signal for data determination; the second matched filter for receiving the electronic wave signal from the antenna section and outputting a second output signal when the second matched filter detects a data signal; a delay time measuring section for detecting which one is firstly outputted between the first or second output signal and outputting the detected result; and a data determining section for receiving the detected result from the delay time measuring section and determining whether the data signal is a first level or a second level of a binary logic level.

Preferably, the reference signal and the data signal are pattern signals formed by a plurality of periodic pulses.

More preferably, the ultra-wideband wireless receiver further comprises an amplifier for amplifying the wireless wave signal from the antenna section and outputting the wireless amplified wave signal to the first and second matched filters.

Most preferably, the delay time measuring section includes: a first circuit for receiving the first output signal from the first matched filter and calculating a square value or an absolute value of the first output signal; and a second circuit for receiving the second output signal from the second matched filter and calculating a square value or an absolute value of the second output signal.

Also, the delay time measuring section includes: a first latch section for receiving and latching the first output signal from the first matched filter; a second latch section for receiving and latching the second output signal from the second matched filter; a first storage unit for receiving the first output signal from the first matched filter and reading the second output signal; a second storage unit for receiving the second output signal from the second matched filter and reading the first output signal; and a reset section for receiving the signal latched by the first or second latch section and outputting a reset signal.

Furthermore, there is provided an ultra-wideband transmitter comprising: a delay time controller for generating and inputting a periodic pulse to a first matched filter, outputting the periodic pulse to a second matched filter when first and second data to be transmitted are at a first level of a binary logic level, and outputting the periodic pulse to a third matched filter when the first data to be transmitted are at a first level of the binary logic level and the second data to be transmitted are at a second level of the binary logic level, outputting the periodic pulse to a fourth matched filter when the first data to be transmitted are at the second level of the binary logic level and the second data to be transmitted are at the first level of the binary logic level, and outputting the periodic pulse to a fifth matched filter when both of the first and second data to be transmitted are at the second level of the binary logic level; the first matched filter for receiving the periodic pulse from the delay time controller and for outputting a reference signal for data determination; the second matched filter for receiving the periodic pulse from the delay time controller and for outputting a data signal earlier than the reference signal by a predetermined time; the third matched filter for receiving the periodic pulse from the delay time controller and for outputting a data signal later than the reference signal by a predetermined time; the fourth matched filter for receiving the periodic pulse from the delay time controller and for outputting a data signal later than the third matched filter by a predetermined time; the fifth matched filter for receiving the periodic pulse from the delay time controller and for outputting a data signal later than the fourth matched filter by a predetermined time; an adder for adding outputs for the first through fifth matched filters to each other and outputting an added signal; and an antenna section for receiving the added signal from the adder and transmitting the received added signal into the air.

There is also provided an ultra-wideband transmitter comprising: an antenna section for receiving and outputting a wireless wave signal to first through fifth matched filters; the first matched filter for receiving the wireless wave signal from the antenna section and outputting a first output signal when the first matched filter detects a reference signal for data determination; the second matched filter for receiving the wireless wave signal from the antenna section and outputting a second output signal earlier than the first matched filter by a predetermined time when the second matched filter detects the reference signal; the third matched filter for receiving the wireless wave signal from the antenna section and outputting a third output signal earlier than the second matched filter by a predetermined time when the third matched filter detects the reference signal; the fourth matched filter for receiving the wireless wave signal from the antenna section and outputting a fourth output signal earlier than the third matched filter by a predetermined time when the fourth matched filter detects the reference signal; the fifth matched filter for receiving the wireless wave signal from the antenna section and outputting a fifth output signal when the fifth matched filter detects a data signal; a delay time measuring section for detecting which signal is outputted first from among the first and second output signals and outputting the detected signal; and a data determining section for receiving the detected result from the delay time measuring section and determining whether the data signal is a combination of a first level and a first level, the first level and a second level, the second level and the first level, or the second level and the second level of a binary logic level.

There is also provided an ultra-wideband wireless communication method using an ultra-wideband transmitter and receiver, the transmitter includes a delay time controller, first through third matched filters, an adder, and a first antenna section, and the receiver includes a first antenna section, fourth and fifth matched filters, a delay time measuring section, and a data determining section, the method comprising the steps of: generating and inputting a periodic pulse to a first matched filter, outputting the periodic pulse to a second matched filter when data to be transmitted are at a first level of a binary logic level, and outputting the periodic pulse to a third matched filter when the data to be transmitted are at a second level of the binary logic level by the delay time controller; receiving the periodic pulse from the delay time controller and for outputting a reference signal for data determination by the first matched filter; receiving the periodic pulse from the delay time controller and for outputting a first data signal earlier than the reference signal by a predetermined time by the second matched filter; receiving the periodic pulse from the delay time controller and for outputting a second data signal later than the reference signal by a predetermined time by the third matched filter; adding outputs of the first, second, and third matched filters to each other and outputting an added signal by the adder; receiving the added signal from the adder and radiating the received added signal into the air by the first antenna section; receiving and outputting an electronic wave signal to first and second matched filters by the second antenna section; receiving the electronic wave signal from the antenna section and outputting a first output signal when the first matched filter detects a reference signal for data determination by the fourth matched filter; receiving the electronic wave signal from the antenna section and outputting a second output signal when the second matched filter detects a data signal by the fifth matched filter; detecting which one is firstly outputted between the first or second output signal and outputting the detected result by the delay time measuring section; and receiving the detected result from the delay time measuring section and determining whether the data signal is a first level or a second level of a binary logic level by the data determining section.

Preferably, the reference signal, the first data signal, and the second data signal are pattern signals formed by a plurality of periodic pulses.

More preferably, the ultra-wideband wireless communication method further comprises receiving and amplifying the added signal from the adder and outputting the amplified signal to the first and second matched filters by an amplifier of the ultra-wideband transmitter.

The wireless ultra-wideband communication method further comprises receiving and amplifying the added signal from the adder and outputting the amplified signal to the first and second matched filters by an amplifier of the ultra-wideband wireless receiver.

Most preferably, the delay time measuring section includes: a first circuit for receiving the first output signal from the first matched filter and calculating a square value or an absolute value of the first output signal; and a second circuit for receiving the second output signal from the second matched filter and calculating a square value or an absolute value of the second output signal.

Also, the delay time measuring section includes: a first latch section for receiving and latching the first output signal from the first matched filter; a second latch section for receiving and latching the second output signal from the second matched filter; a first storage unit for receiving the first output signal from the first matched filter and reading the second output signal; a second storage unit for receiving the second output signal from the second matched filter and reading the first output signal; and a reset section for receiving the signal latched by the first or second latch section and outputting a reset signal.

BRIEF DESCRIPTION OF THE DRAWINGS

The above and other objects, features, and advantages of the present invention will be more apparent from the following detailed description taken in conjunction with the accompanying drawings, in which:

FIG. 15 is a data determining table which is used for a data determination by a data determining section 13;

FIG. 26 is a data determining table which is used for a data determination by a data determining section 36;

FIG. 31 is a data determining table which is used for a data determination by a data determining section of the ultra-wideband wireless receiver according to a third embodiment of the present invention;

DETAILED DESCRIPTION OF THE PREFERRED EMBODIMENT

An ultra-wideband transmitter and receiver, and a ultra-wideband wireless communicating method according to preferred embodiments of the present invention will be described in detail herein below with reference to the accompanying drawings. In the following description of the present invention, a detailed description of known functions and configurations incorporated herein will be omitted when it may make the subject matter of the present invention rather unclear.

Figure 1:
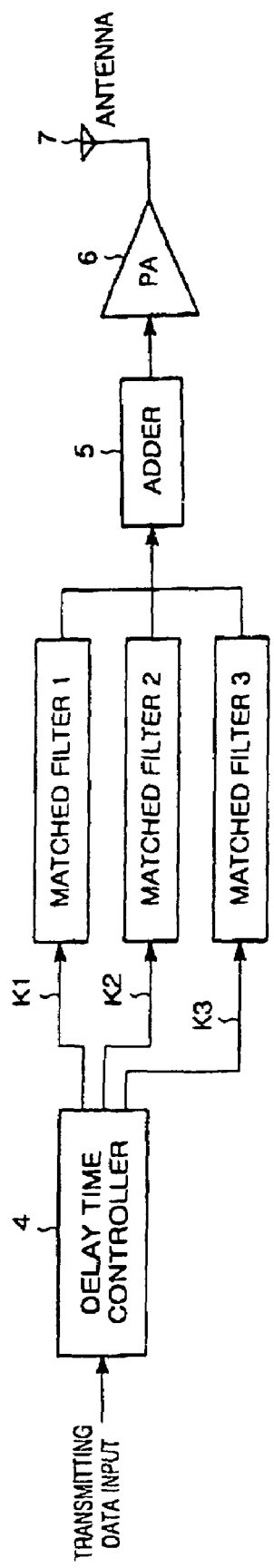
FIG. 1 is a view illustrating a configuration of an ultra-wideband transmitter according to a first embodiment of the present invention.

FIG. 1 is a view illustrating a configuration of a transmitter of an ultra-wideband wireless transceiver according to an embodiment of the present invention. The ultra-wideband transmitter includes a first matched filter 1, a second matched filer 2, a third matched filter 3, a delay time controller 4, an adder 5, a power amplifier (PA) 6, and an antenna 7.

Figure 2:
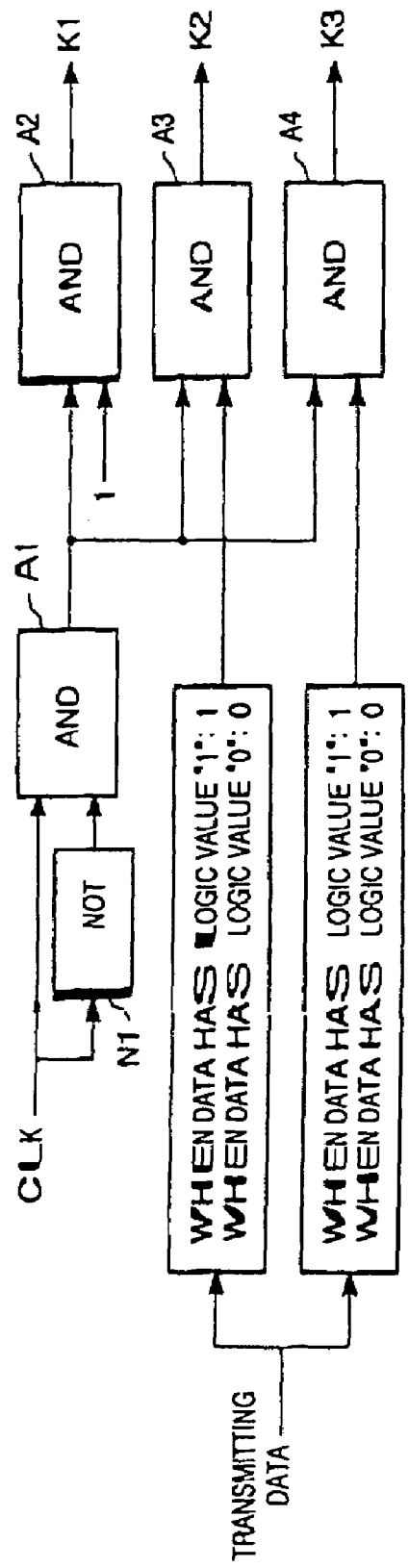
FIG. 2 is a view illustrating a view of details of the delay time controller illustrated in FIG. 1.

FIG. 2 is a view illustrating details of the delay time controller 4 illustrated in FIG. 1. The delay time controller 4 includes first, second, third, and fourth "AND circuits" A1, A2, A3, and A4, and an inverter N1.

Figure 3:
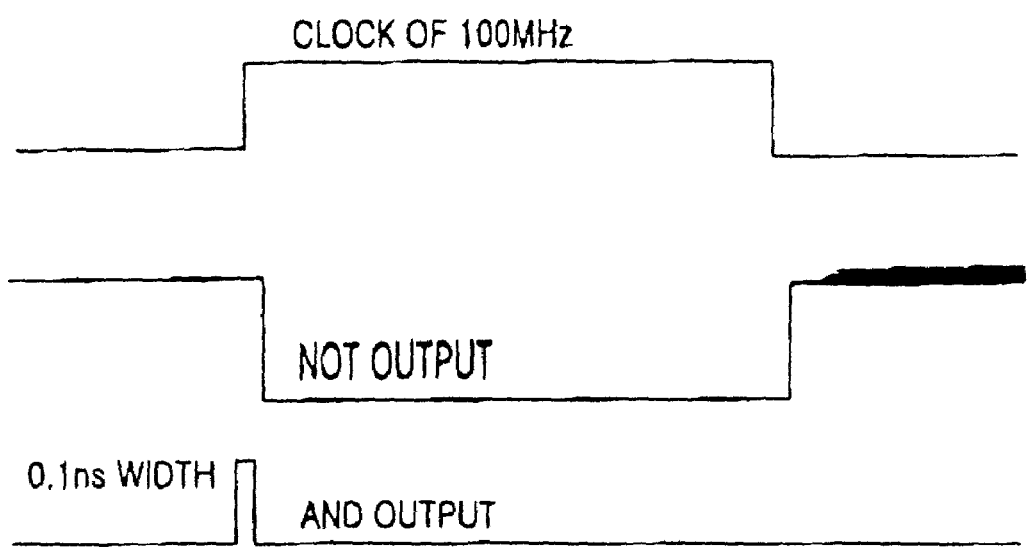
FIG. 3 is a view illustrating impulses generated by the delay time controller illustrated in FIG. 2.

FIG. 3 is a view illustrating impulses generated by the delay time controller 4 illustrated in FIG. 2. As illustrated in FIG. 3, the inverter N1 receives and inverts a clock CLK of 100 MHz generated by a crystal oscillator (not illustrated) and outputs an inverted signal to the first AND circuit A1. The first AND circuit A1 AND controls the clock CLK and the inverted signal from the inverter N1 and generates a pulse as an output thereof. At this time, for example, as illustrated in FIG. 3, a time period of the pulse becomes about 0.1 nsec.

The second AND circuit A2 AND controls the pulse from the first AND A1 and an input signal of logic value "1", and outputs an output signal K1 to the first matched filter 1. The third AND circuit A3 AND conrtols the pulse from the first AND circuit A1 and an input signal, and transmits an output signal K2 to the second matched filter 2. The input signal of the third AND circuit A3 has logic values "1" and "0" when data to be transmitted has logic values "1" or "0", respectively. Also, the fourth AND circuit A4 AND controls the pulse from the first AND circuit A1 and an input signal, and transmits an output signal K3 to the third matched filter 3. The input signal of the fourth AND circuit A4 has logic values "1" and "0" when data to be transmitted has logic values "0" and "1", respectively.

More specifically, the delay time controller 4 operates in such a manner that the output signals K1 and K2 are transmitted to the first and second matched filters 1 and 2, respectively, when the data to be transmitted has the logic value "1", whereas the output signals K1 and K3 are transmitted to the first and third matched filters 1 and 3, respectively, when the data has the logic value "0".

Figure 4:
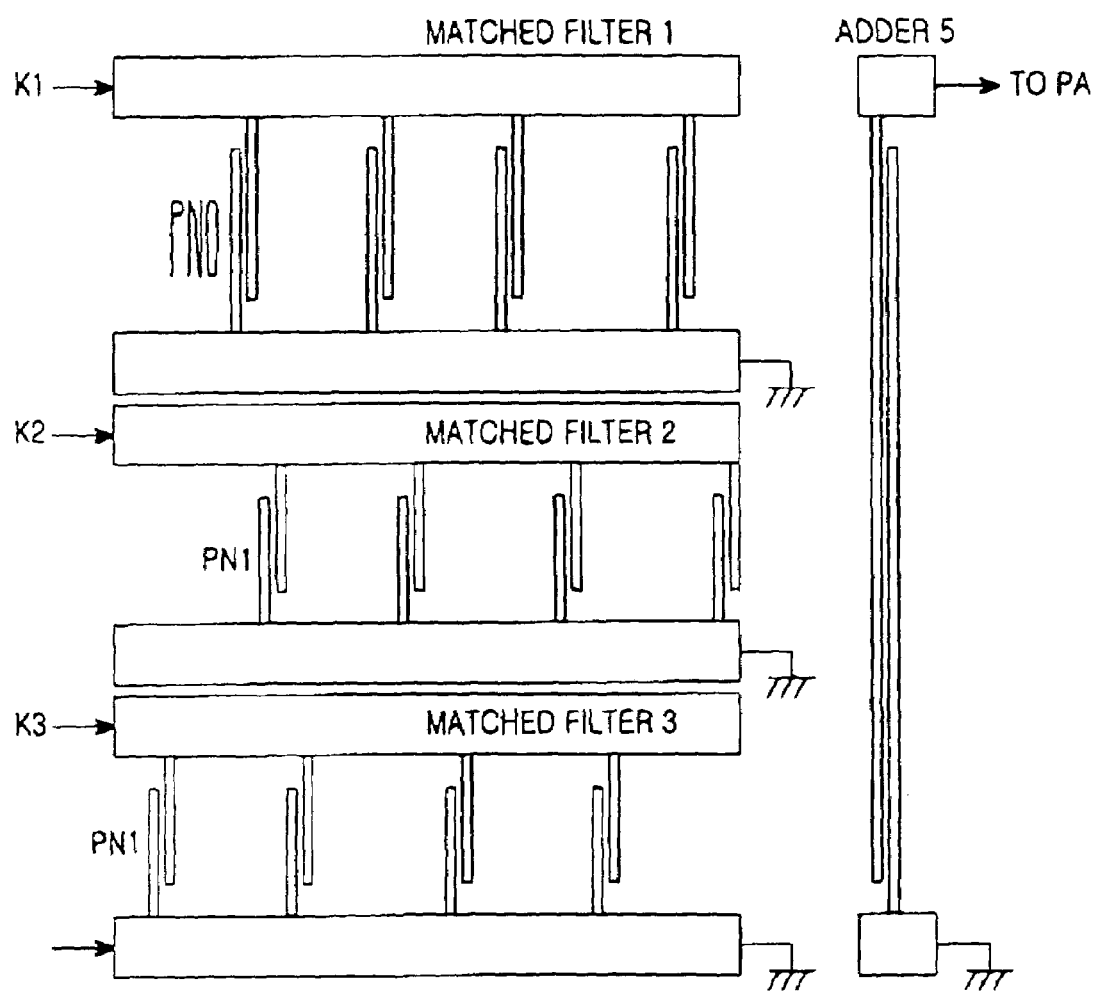
FIG. 4 is an enlarged detail illustrating configurations of the first, second, and third matched filters, and the adder illustrated in FIG. 1.

FIG. 4 is an enlarged detail illustrating each example of the first, second, and third matched filters 1, 2, and 3, and the adder 5 illustrated in FIG. 1. Each of the first, second, and third matched filters 1, 2, and 3 includes a Surface Acoustic Wave (SAW) matched filter. The first matched filter 1 receives the output signal K1 from the delay time controller 4 and outputs a reference signal for data determination to the adder 5. The reference signal includes 4 pulses.

Figure 5:
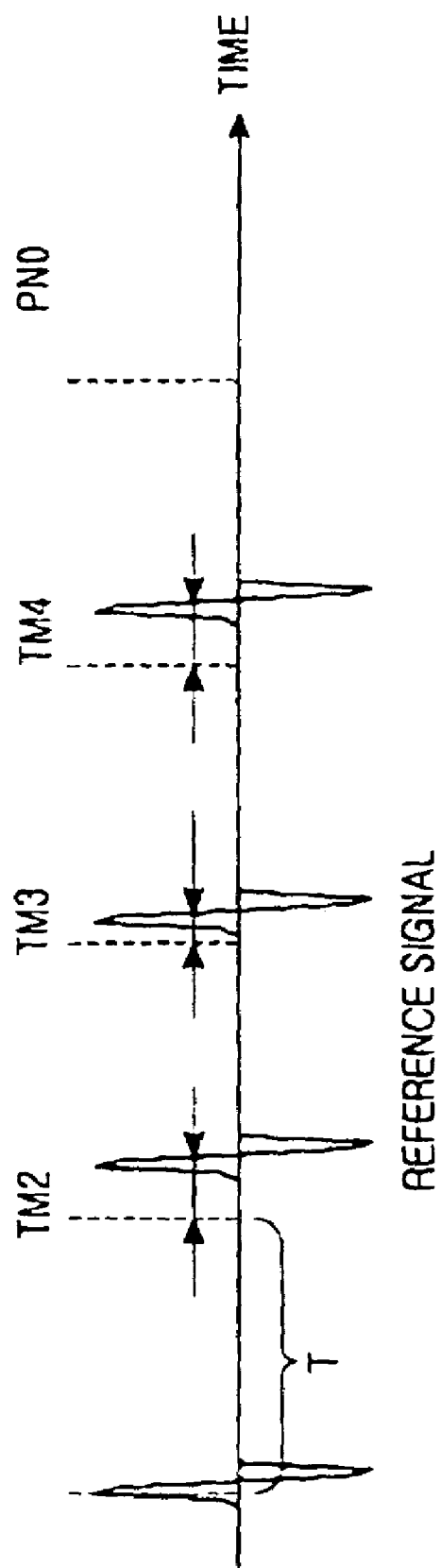
FIG. 5 is a waveform diagram illustrating a waveform of a signal spread by a spreading code PN0.

FIG. 5 is a waveform diagram illustrating a waveform of a signal spread by a spreading code PN0. The reference signal has 4 pulses as illustrated in FIG. 5. As illustrated in FIG. 5, time axis is divided into a plurality of sections in such a manner that it has one section for every time period T. Reference time is illustrated by a dotted line in FIG. 5. The arranged pattern of comb power in the first matched filter 1 has a structure which corresponds to a signal pattern of positive and negative pulses generated at intervals of time 0, pseudo random times TM2, TM3, and TM4 from the reference time. According to the arranged pattern of comb power, a spread code PN0 is formed by the arranged pattern of comb power.

Figure 6:
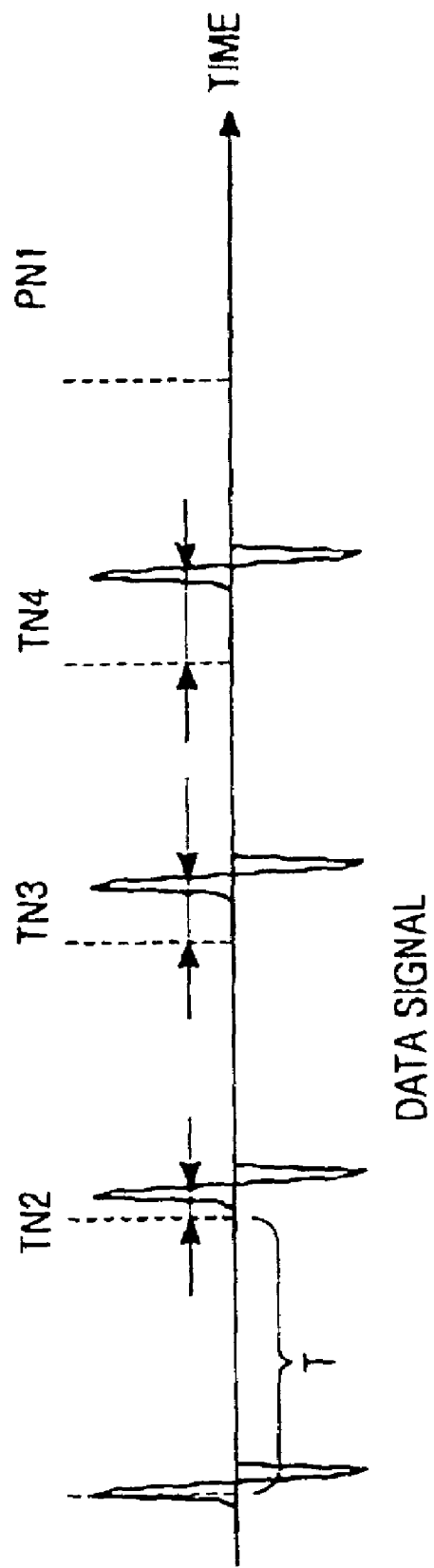
FIG. 6 is a waveform diagram illustrating a waveform of a signal spread by a spreading code PN1.

FIG. 6 is a waveform diagram illustrating a waveform of a signal spread by a spreading code PN1. Each of the second and third matched filters 2 and 3 outputs a data signal. The data signal includes 4 pulses. As illustrated in FIGS. 4 and 6, the arranged pattern of comb power in each of the second and third matched filters has a structure which corresponds to a signal pattern of positive and negative pulses generated at intervals of time 0, pseudo random times TN2, TN3, and TN4 from the reference time. According to the arranged pattern of comb power, a spread code PN1 is formed by the arranged pattern of comber power.

The adder 5 adds the data signal from the second matched filter 2 or the data signal form the third matched filter 3 to the reference signal from the first matched filter 1, and outputs an added signal to the PA 6. The PA 6 receives and amplifies the added signal from the adder 5 and outputs the amplified signal to the antenna section 7. The antenna section 7 radiates the amplified signal from the PA 4 into the air as an electronic wave.

Figure 7:
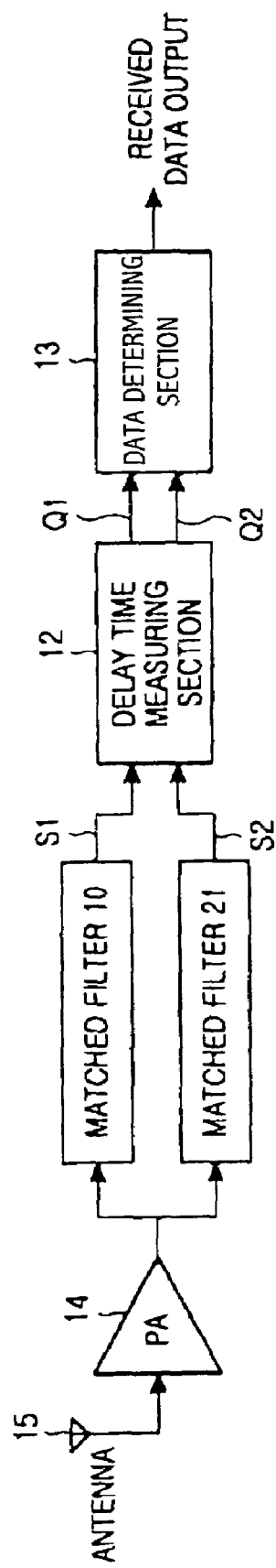
FIG. 7 is a view illustrating a configuration of an ultra-wideband wireless receiver according to a first embodiment of the present invention.

FIG. 7 is a view illustrating a configuration of an ultra-wideband wireless receiver according to a first embodiment of the present invention. The ultra-wideband wireless receiver includes a first matched filter 10, a second matched filter 11, a delay time measuring section 12, a data determining section 13, a PA 14, and an antenna section 15. The antenna section 15 receives and outputs an electronic wave signal to the PA 14. The PA 14 receives and amplifies the electronic wave signal from the antenna section 15, and outputs the amplified signal to the first and second matched filters 10 and 11.

Figure 8:
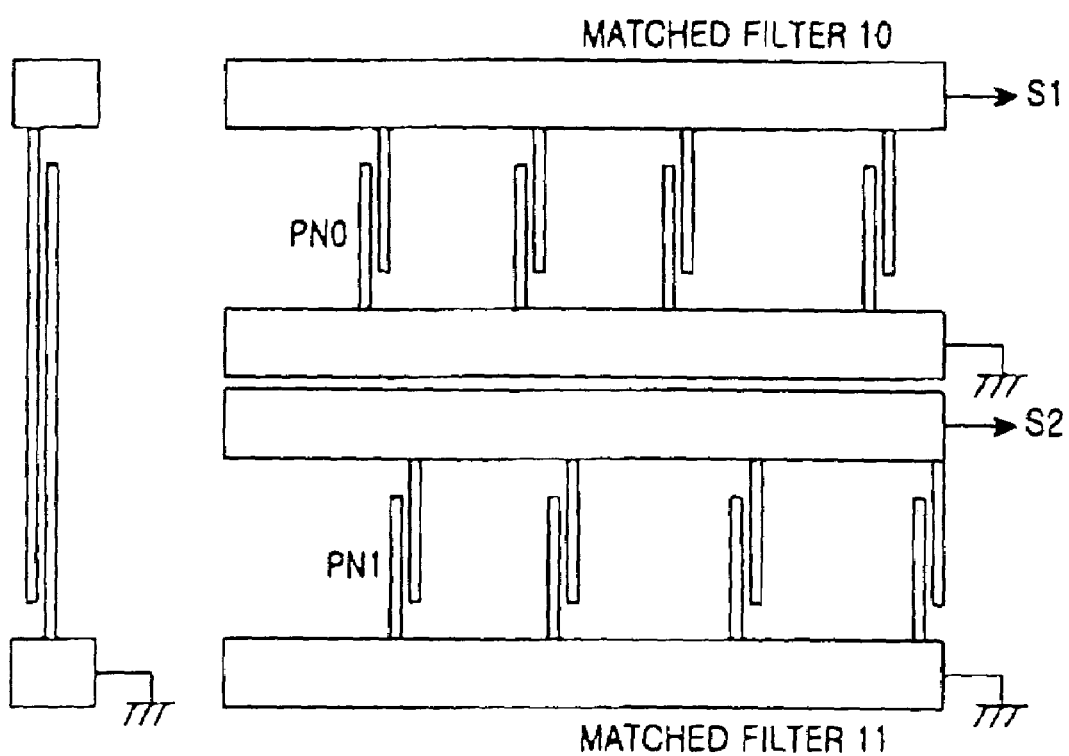
FIG. 8 is an enlarged detail illustrating configurations of the matched filters illustrated in FIG. 7.

FIG. 8 is an enlarged detail illustrating configurations of the first and second matched filters 10 and 11 illustrated in FIG. 7. Each of the first and second matched filters 10 and 11 includes the same SAW matched filter as the first, second, and third matched filters 1, 2, and 3 in the ultra-wideband transmitter. The first matched filter 10 resonates the amplified signal from the PA 14 at a pattern of the reference signal and outputs a predetermined pulse to the delay time measuring section 12. The reference signal includes 4 pulses illustrated in FIG. 5. The arranged pattern of comb power in the first matched filter 10 has a structure which resonates at the signal pattern of positive and negative pulses generated at intervals of time 0, pseudo random times TM2, TM3, and TM4 from the reference time. According to the arranged pattern of comb power, a spreading code spread by a spreading code PN1 is detected and the first matched filter 10 outputs an output signal S1 to the time delay measuring section 12. The second matched filter 11 resonates the amplified signal from the PA 14 at a pattern of the reference signal and outputs a predetermined pulse to the delay time measuring section 12. The reference signal includes 4 pulses illustrated in FIG. 6. The arranged pattern of comb power in the second matched filter 11 has a structure which resonates at the signal pattern of positive and negative pulses generated at intervals of time 0, pseudo random times TN2, TN3, and TN4 from the reference time. According to the arranged pattern of comb power, a spreading code, which is spread by a spreading code PN1, is detected and the second matched filter 11 outputs an output signal S2 to the time delay measuring section 12.

Figure 9:
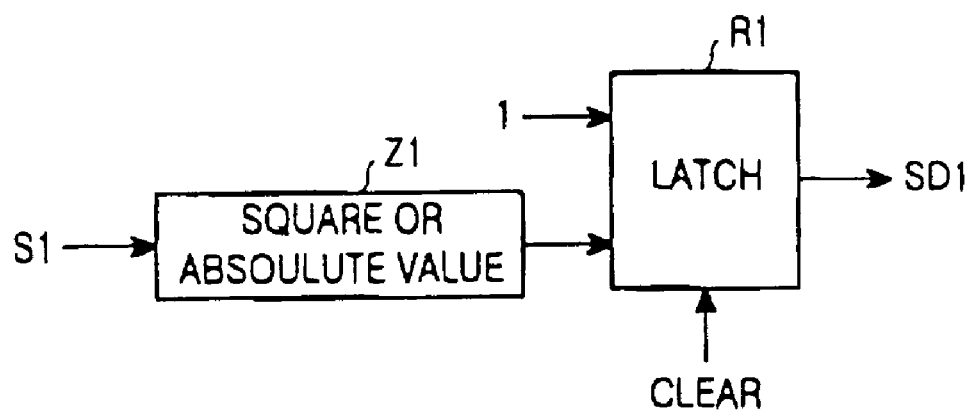
FIG. 9 is a view illustrating a configuration of a first latch circuit R1.
Figure 10:
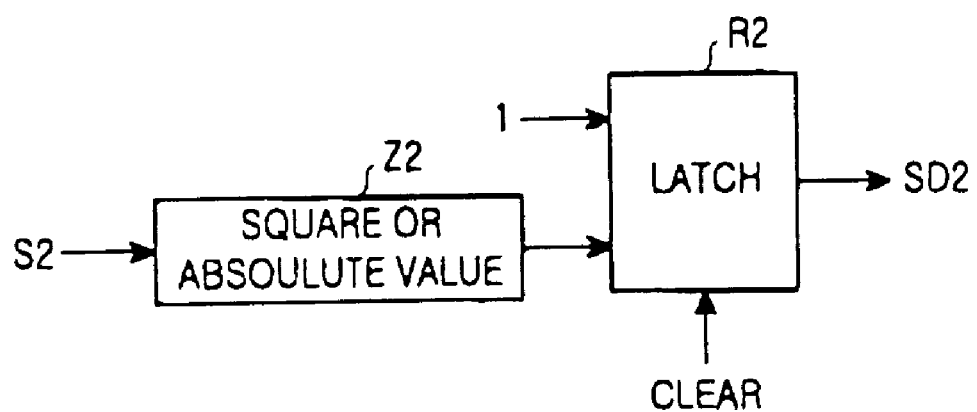
FIG. 10 is a view illustrating a configuration of a second latch circuit R2.
Figure 11:
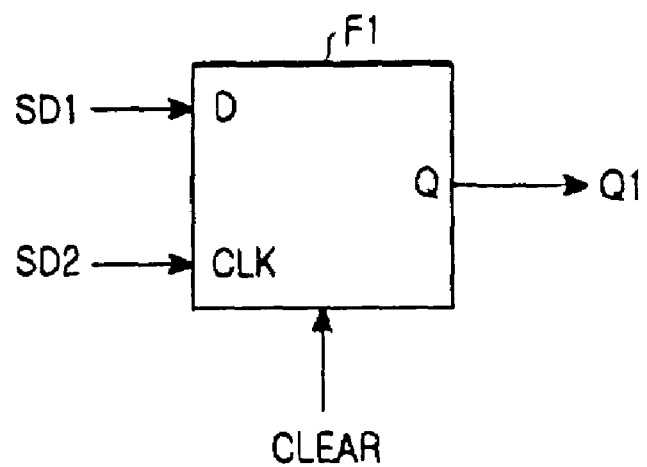
FIG. 11 is a view illustrating a configuration of a first D-flip flop circuit F1.
Figure 12:
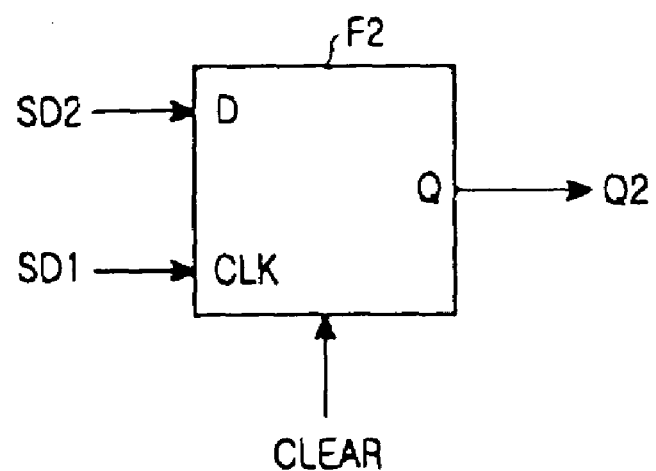
FIG. 12 is a view illustrating a configuration of a second D-flip flop circuit F2.

FIG. 9 is a view illustrating a configuration of a first latch circuit R1, FIG. 10 is a view illustrating a configuration of a second latch circuit R2, FIG. 11 is a view illustrating a configuration of a first D-flip flop circuit F1, and FIG. 12 is a view illustrating a configuration of a second D-flip flop circuit F2. The delay time measuring section 12 includes the first and second latch circuits R1 and R2 and square or absolute value circuits Z1 and Z2 illustrated in FIGS. 9 and 10, the first and second D-flip flop circuits F1 and F2 illustrated in FIGS. 11 and 12, and the clear circuit illustrated in FIGS. 13 and 14.

The first square or absolute value circuit Z1 receives the output signal S1 from the first matched filter 10, produces and outputs a square or absolute value of the output signal S1 to the first latch circuit R1. When the first latch circuit R1 receives the square or absolute value of the output signal S1 and detects a rising edge of the output signal S1, the first latch circuit R1 outputs a first latched signal SD1 to the first and second D-flip flop circuits F1 and F2.

In the same manner, the second square or absolute value circuit Z2 receives the output signal S2 from the second matched filter 11, produces and outputs a square or absolute value of the output signal S2 to the second latch circuit R2. When the second latch circuit R2 receives the square or absolute value of the output signal S2 and detects a rising edge of the output signal S2, the second latch circuit R2 outputs a second latched signal SD2 to the first and second D-flip flop circuits F1 and F2.

The first latched signal SD1 and the second latched signal SD2 are input to a D terminal and a clock terminal CLK of the first D-flip flop circuit F1, respectively. When an input status of the clock terminal CLK thereof changes from a logic level "L" to a logic level "H", the first latched signal SD1 reads an input status of the D terminal thereof and outputs it as an output signal Q1.

The second latched signal SD2 and the first latched signal SD1 are input to a D terminal and a clock terminal CLK of the second D-flip flop circuit F2, respectively. When an input status of the clock terminal CLK thereof changes from a logic level "L" to a logic level "H", the first latched signal SD1 reads an input status of the D terminal thereof and outputs it as an output signal Q2.

Figure 13:
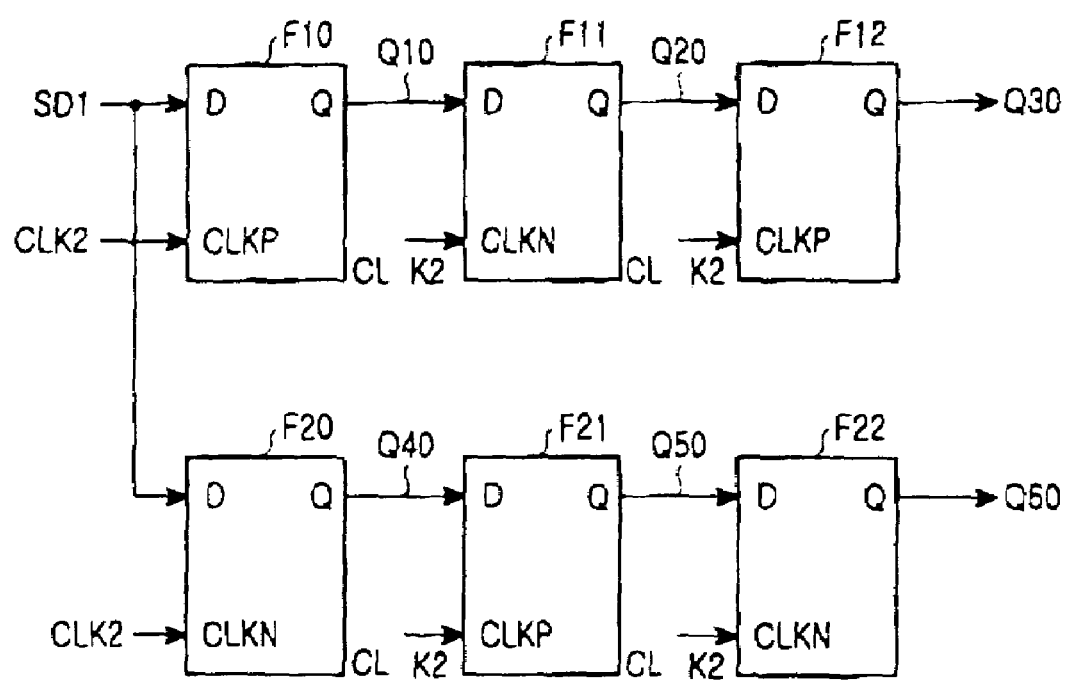
FIG. 13 is a view illustrating a configuration of a front stage of a clear circuit.

FIG. 13 is a view illustrating a configuration of a front stage of a clear circuit. The front state of the clear circuit includes D-flip flops F10~12, and F20~22.

Figure 14:
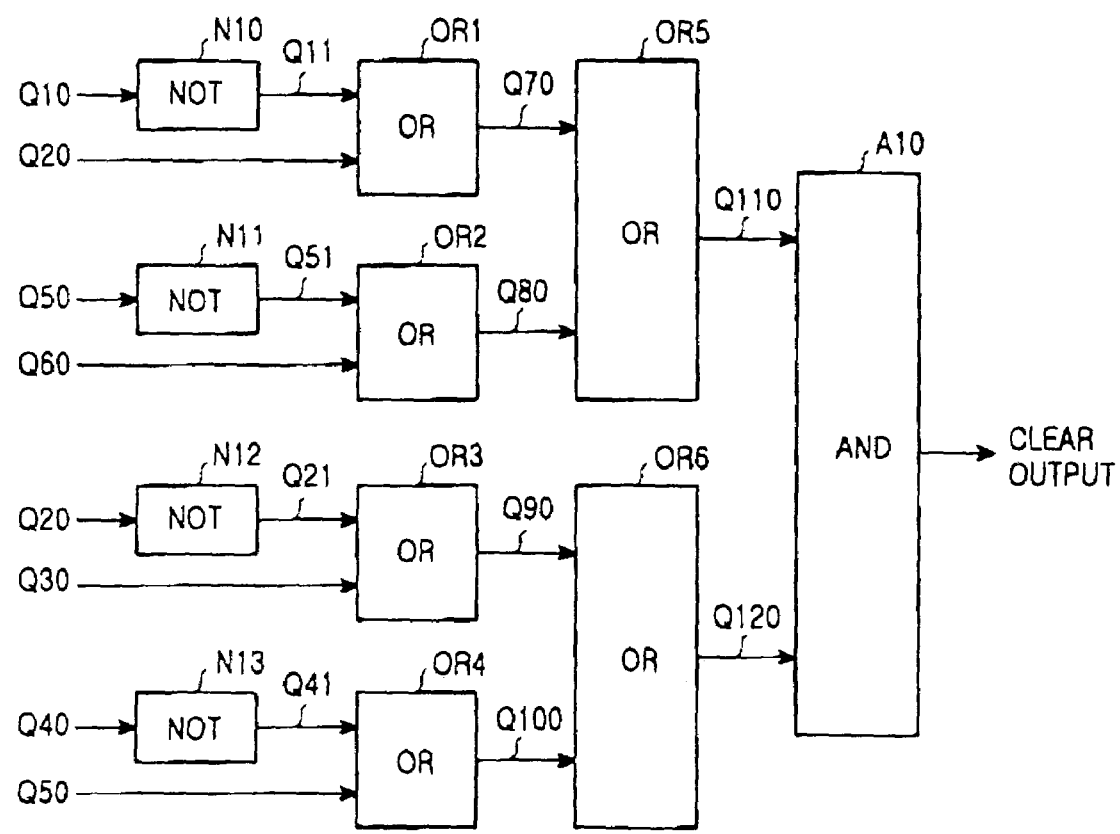
FIG. 14 is a view illustrating a configuration of a rear stage of a clear circuit.

FIG. 14 is a view illustrating a configuration of a rear stage of the clear circuit.

The first latched signal SD1 and the clock signal CLK2 of 200 MHz generated by a crystal oscillator (not illustrated) are input to a D terminal and a CLKP terminal of a D-flip flop circuit F10, respectively. When an input status of the CLKP terminal thereof changes from a logic level "L" to a logic level "H", the D-flip flop circuit 10 reads an input status of the D terminal thereof and outputs it as an output signal Q10. In the same manner, the first latched signal SD1 and the clock signal CLK2 of 200 MHz are input to a D terminal and a CLKN terminal of a D-flip flop circuit F20. When an input status of the CLKN terminal thereof changes from a logic level "L" to a logic level "H", the D-flip flop circuit 20 reads an input status of the D terminal thereof and outputs it as an output signal Q40.

The output signal Q10 of the D-flip flop circuit F10 and the clock signal CLK2 are input to a D terminal and a CLKN terminal of a D-flip flop circuit F11, respectively. When an input status of the CLKN terminal thereof changes from a logic level "L" to a logic level "H", the D-flip flop circuit F11 reads an input status of the D terminal thereof and outputs it as an output signal Q20. In the same manner, the output signal Q40 of the D-flip flop circuit F20 and the clock signal CLK2 are input to a D terminal and a CLKP terminal of a D-flip flop circuit F21, respectively. When an input status of the CLKP terminal thereof changes from a logic level "L" to a logic level "H", the D-flip flop circuit F21 reads an input status of the D terminal thereof and outputs it as an output signal Q50.

The output signal Q20 of the D-flip flop circuit F11 and the clock signal CLK2 are input to a D terminal and a CLKP terminal of a D-flip flop circuit F12, respectively. When an input status of the CLKP terminal thereof changes from a logic level "L" to a logic level "H", the D-flip flop circuit F12 reads an input status of the D terminal thereof and outputs it as an output signal Q30. In the same manner, the output signal Q50 of the D-flip flop circuit F21 and the clock signal CLK2 are input to a D terminal and a CLKP terminal of a D-flip flop circuit F22, respectively. When an input status of the CLKP terminal thereof changes from a logic level "L" to a logic level "H", the D-flip flop circuit F22 reads an input status of the D terminal thereof and outputs it as an output signal Q60.

The rear stage of the clear circuit includes inverter circuits N10~N13, OR circuits OR1~OR6, and an AND circuit A10. The inverter circuit N10 inverts the output signal Q10 of the D-flip flop circuit F10 and outputs an inverted signal Q11. The inverter circuit N11 inverts the output signal Q50 of the D-flip flop circuit F21 and outputs an inverted signal Q51. The inverter circuit N12 inverts the output signal Q20 of the D-flip flop circuit F11 and outputs an inverted signal Q21. The inverter circuit N13 inverts the output signal Q40 of the D-flip flop circuit F20 and outputs an inverted signal Q41.

The OR circuit OR1 ORs the output signal Q11 of the inverter circuit N10 and the output signal Q20 of the D-flip flop circuit F11, and outputs an ORed signal Q70. The OR circuit OR2 ORs the output signal Q51 of the inverter circuit N11 and the output signal Q60 of the D-flip flop circuit F22, and outputs an ORed signal Q80. The OR circuit OR3 ORs the output signal Q21 of the inverter circuit N12 and the output signal Q30 of the D-flip flop circuit F12, and outputs an ORed signal Q90. The OR circuit OR4 ORs the output signal Q41 of the inverter circuit N13 and the output signal Q50 of the D-flip flop circuit F21, and outputs an ORed signal Q100.

Also, the OR circuit OR5 ORs the output signal Q11 of the OR circuit OR1 and the output signal Q80 of the OR circuit OR2, and outputs an ORed signal Q110. The OR circuit OR6 ORs the output signal Q90 of the OR circuit OR3 and the output signal Q100 of the OR circuit OR4, and outputs an ORed signal Q120.

The AND circuit A10 ANDs the output signal Q110 of the OR circuit OR5 and the output signal Q120 of the OR circuit OR6, and outputs a clear signal.

Figure 15:
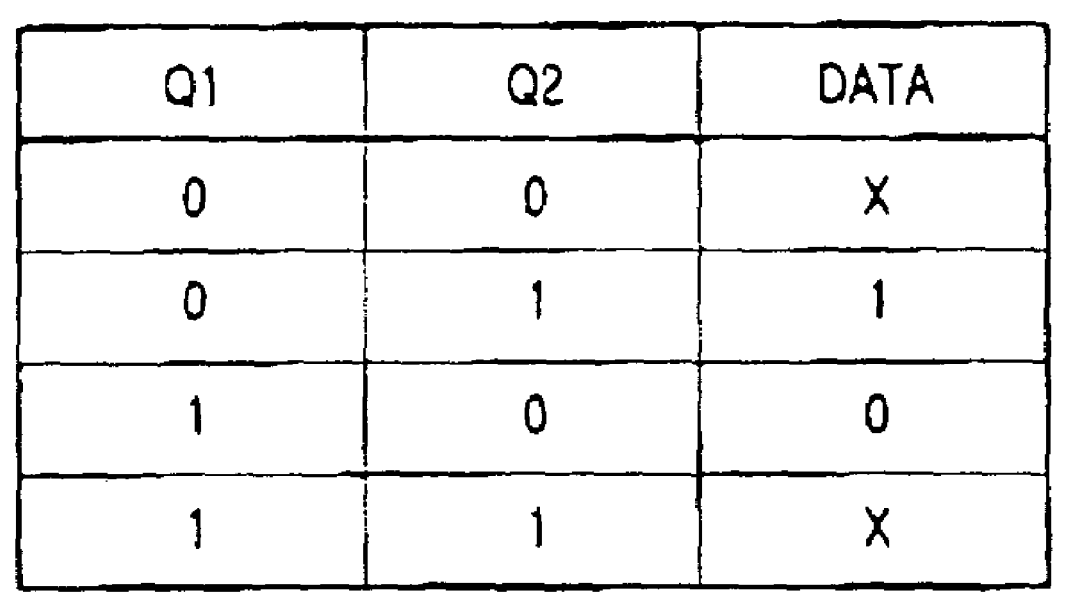

FIG. 15 is a data determining table which is used for a data determination by a data determining section 13. When both of the output signal Q1 of the first D-flip flop circuit F1 and the output signal Q2 of the second D-flip flop circuit F2 have a logic value "0", the data determining section 13 determines that the data signal is in a data denial state. When the output signal Q1 of the first D-flip flop circuit F1 and the output signal Q2 of the second D-flip flop circuit F2 have logic values "0" and "1", respectively, the data determining section 13 determines that the data signal is data 1. When the output signal Q1 of the first D-flip flop circuit F1 and the output signal Q2 of the second D-flip flop circuit F2 have logic values "1" and "0", respectively, the data determining section 13 determines that the data signal is in a data denial state. When both of the output signal Q1 of the first D-flip flop circuit F1 and the output signal Q2 of the second D-flip flop circuit F2 have a logic value "1", respectively, the data determining section 13 determines that the data signal is in the data denial state.

Hereinafter, the operation of the ultra-wideband transmitter and receiver will be described referring to the accompanying drawings.

Figure 16:
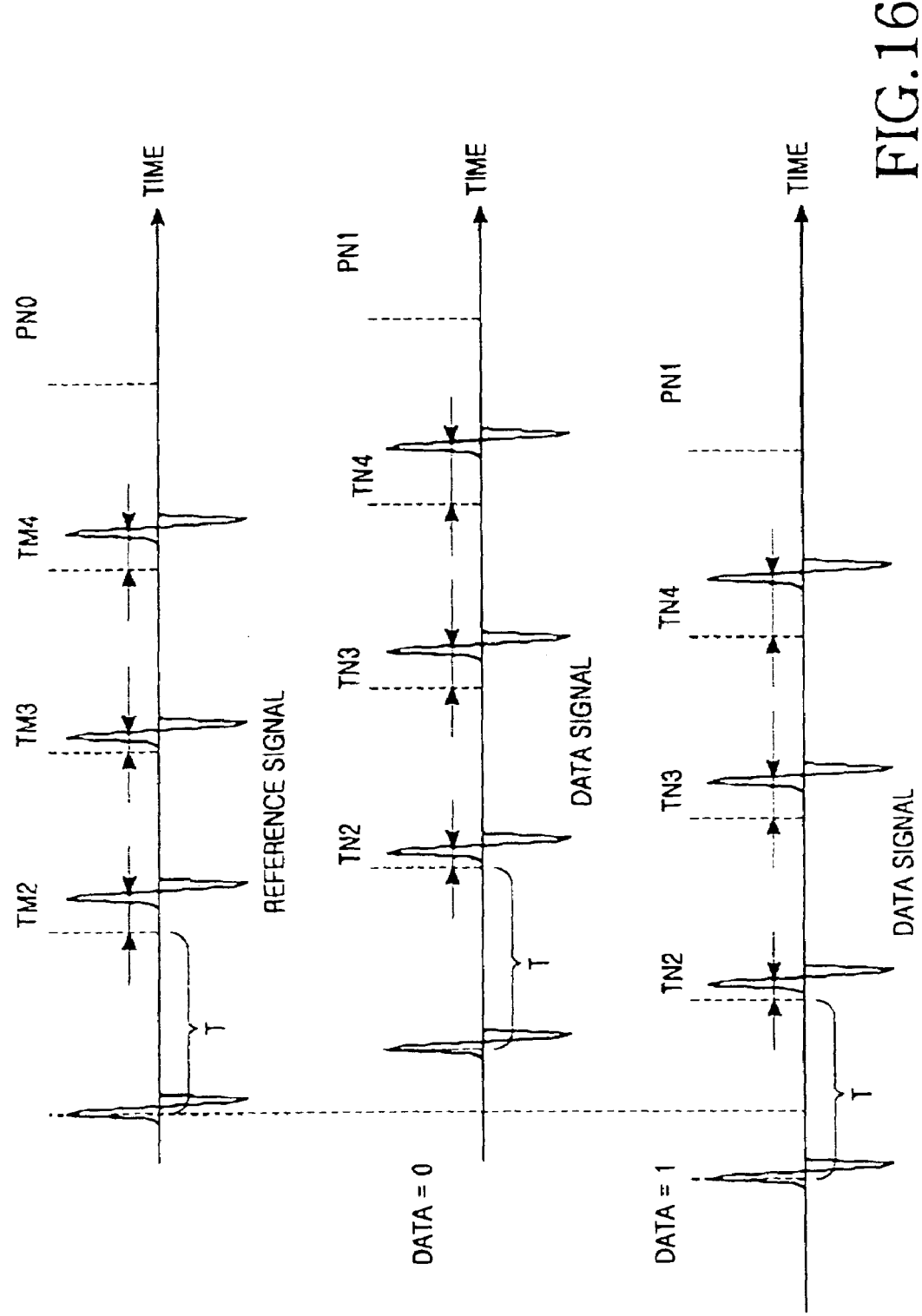
FIG. 16 is a waveform diagram illustrating waveforms of a reference signal and a data signal.

FIG. 16 is a waveform diagram illustrating waveforms of a reference signal and a data signal. In the ultra-wideband transmitter illustrated in FIG. 1, the inverter N1 of the time delay controller 4 receives and inverts a clock CLK of 100 MHz generated by a crystal oscillator (not illustrated) and outputs an inverted signal to the first AND circuit A1. The first AND circuits ANDs the clock CLK and the inverted signal from the inverter N1 and generates a pulse as an output thereof.

The pulse is input to the AND circuit A2 and an output signal K1 of the delay time controller 4 is input to a first matched filter 1. As illustrated in FIG. 16, the first matched filter 1 receives the output signal K1 of the delay time controller 4 and generates respective pulses at intervals of time 0, pseudo random times TM2, TM3, and TM4 from the reference time. Time axis is divided into a plurality of sections in such a manner that it has one section for every time period T in an upper part of FIG. 16. The reference time is illustrated by a dotted line in FIG. 16.

When data to be transmitted is input to the AND circuit A3, the third AND circuit A3 ANDs the pulse from the first AND circuit A1 and an input signal, and transmits an output signal K2 to the second matched filter 2. The input signal of the third AND circuit A3 has logic values "1" and "0" when data to be transmitted has logic values "1" or "0", respectively.

As illustrated in a middle part of FIG. 16, the second matched filter 2 spreads a signal K2 input earlier than the first matched filter 1 by a predetermined time into a wideband by means of a spreading code PN1. The spreading code PN1 is a spreading code 1. That is, as illustrated in a lower part of FIG. 16, the second matched filter 2 generates respective pulses at intervals of time 0, pseudo random times TN2, TN3, and TN4 from the reference time. Time axis is divided into a plurality of sections in such a manner that it has one section for every time period T in a lower part of FIG. 16. The reference time is illustrated by a dotted line in the lower part of FIG. 16. A signal pattern includes four pulses. The signal pattern becomes a data signal indicating data 1 when it is compared with the reference signal.

When the data to be transmitted is input to the fourth AND circuit A4, the fourth AND circuit A4 ANDs the pulse from the first AND circuit A1 and an input signal, and transmits an output signal K3 to the third matched filter 3. The input signal of the fourth AND circuit A4 has logic values "1" and "0" when data to be transmitted has logic values "0" and "1", respectively. As illustrated in FIG. 4, the third matched filter 3 spreads a signal K3 input later than the first matched filter 1 by a predetermined time into a wideband by means of a spreading code PN1. The spreading code PN1 is a spreading code 1. That is, as illustrated in a middle part of FIG. 16, the third matched filter 3 generates respective pulses at intervals of time 0, pseudo random times TN2, TN3, and TN4 from the reference time. Time axis is divided into a plurality of sections in such a manner that it has one section for every time period T in the middle part of FIG. 16. The reference time is illustrated by a dotted line in the middle part of FIG. 16. A signal pattern includes four pulses. The signal pattern becomes a data signal indicating data 0 when it is compared with the reference signal.

The adder 5 adds the data signal from the second matched filter 2 to the reference signal from the first matched filter 1 when the data to be transmitted have a logic value "1", and outputs an added signal to the PA 6. Also, the adder 5 adds the data signal from the third matched filter 2 to the reference signal from the first matched filter 1 when the data to be transmitted have a logic value "0", and outputs an added signal to the PA 6. The PA 6 receives and amplifies a level of the added signal from the adder 5 and outputs the amplified signal to the antenna section 7. The antenna section 7 radiates the amplified signal from the PA 4 into the air as an electronic wave.

In the ultra-wideband wireless receiver illustrated in FIG. 7, the antenna section 15 receives the electronic wave radiated from the antenna section 7 of the ultra-wideband transmitter, and outputs the electronic wave signal to the PA 14. The PA 14 amplifies a level of the electronic wave signal from the antenna section 15 and outputs the amplified signal to first and second matched filters 10 and 11. The first matched filter 10 resonates the amplified signal from the PA 14 at a spreading signal spread by a spreading code PN0 among the amplified signal, and outputs an output signal S1. The second matched filter 11 detects a spreading code spread by a spreading code PN1 from the amplified signal from the PA 14, and outputs an output signal S2.

At this time, when the received data has a logic value "1", an input spreading code is a reference signal and a data signal of upper and lower parts of FIG. 16. Because the data signal is input earlier than the reference signal, the second matcher filter 11 outputs the output signal S2 earlier than the output signal S1 which the first matched filter 10 outputs.

Further, when the received data has a logic value "0", an input spreading code is a reference signal and a data signal of upper and middle parts of FIG. 16. Because the data signal is input later than the reference, the first matcher filter 10 outputs the output signal S1 later than the output signal S2 which the second matched filter 11 outputs.

When the output signal S1 of the first matched filter 10 and the output signal S2 of the second matched filter 11 are input to the delay time measuring section 12, the delay time measuring section 12 outputs output signals Q1 and Q2.

The first latched signal SD1 and the second latched signal SD2 are input to a D terminal and a clock terminal CLK of the first D-flip flop circuit F1, respectively. Also, the second latched signal SD2 and the first latched signal SD1 are input to a D terminal and a clock terminal CLK of the second D-flip flop circuit F2, respectively. When the received data are data 1, the second latched signal SD2 are input to the first and second D-flip flop circuit F1 and F2 earlier than the first latched signal SD1. Accordingly, when the second latched signal SD2 is input to the clock terminal CLK of the first D-flip flop circuit F1 and an input status of the clock terminal CLK thereof changes from a logic level "L" to a logic level "H", the first latched signal SD1 is input thereto yet and the D terminal of the first D-flip flop circuit F1 is at a low logic level, so that an output signal Q1 of the first D-flip flop circuit F1 becomes a logic value "0". Also, when the first latched signal SD1 is input to the clock terminal CLK of the second D-flip flop circuit F2 and an input status of the clock terminal CLK thereof changes from a logic level "L" to a logic level "H", the second latched signal SD2 has been already input thereto and the D terminal of the second D-flip flop circuit F2 is at a high logic level, so that an output signal Q2 of the second D-flip flop circuit F2 becomes a logic value "1".

When the received data is data 0, the first latched signal SD1 is input to the first and second D-flip flop circuit F1 and F2 earlier than the second latched signal SD2. Accordingly, when the second latched signal SD2 is input to the clock terminal CLK of the first D-flip flop circuit F1 and an input status of the clock terminal CLK thereof changes from a logic level "L" to a logic level "H", the first latched signal SD1 has been already input thereto and the D terminal of the first D-flip flop circuit F1 is at a high logic level, so that an output signal Q1 of the first D-flip flop circuit F1 becomes a logic value "1". Also, when the first latched signal SD1 is input to the clock terminal CLK of the second D-flip flop circuit F2 and an input status of the clock terminal CLK thereof changes from a logic level "L" to a logic level "H", the second latched SD2 is not input thereto yet and the D terminal of the second D-flip flop circuit F2 is at a low logic level, so that an output signal Q2 of the second D-flip flop circuit F2 becomes a logic value "0".

When the output signals Q1 and Q2 of the first and second D-flip flop circuits F1 and F2 are input to the data determining section 13, respectively, the data determining section 13 performs a data determination based on the data determining table illustrated in FIG. 15, and outputs the judged result as received data.

Further, when the first latched signal SD1 is input to the clear circuit, a front stage of the clear circuit outputs the output signals Q10, Q20, Q30, Q40, Q50, and Q60 to a rear stage of the clear circuit. The rear stage of the clear circuit receives the signals Q10, Q20, Q30, Q40, Q50, and Q60 from the front stage of the clear circuit and outputs a clear signal.

Figure 17:
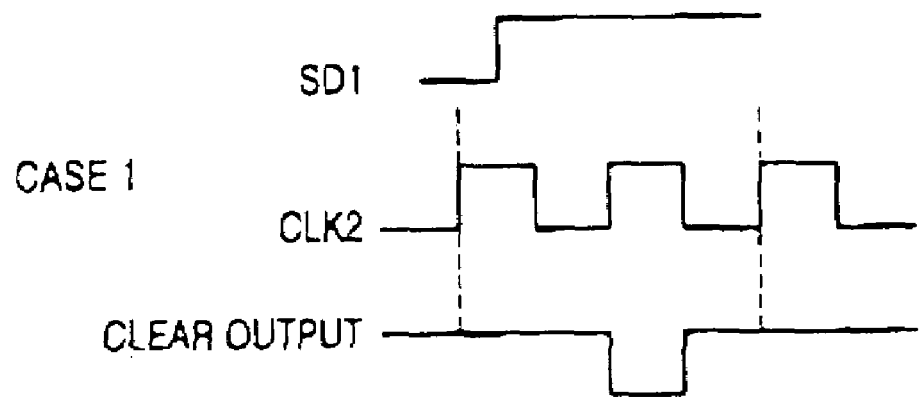
FIG. 17 is a waveform diagram illustrating an output of a clear signal in the case 1.
Figure 18:
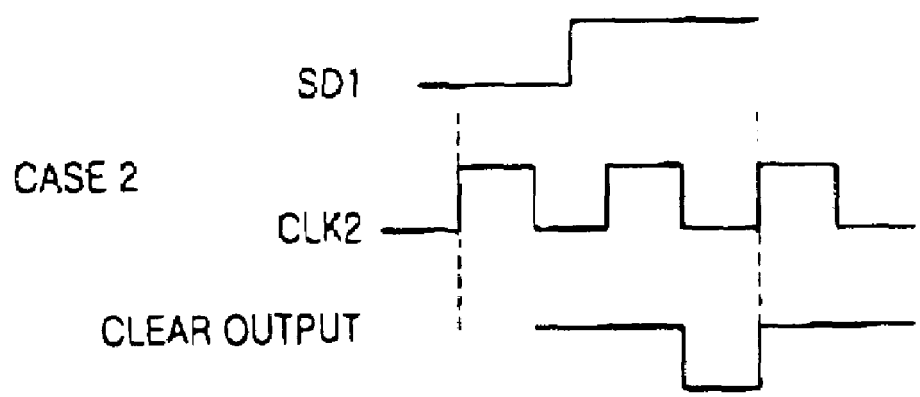
FIG. 18 is a waveform diagram illustrating an output of a clear signal in the case 2.

FIG. 17 is a waveform diagram illustrating a clear signal of a clear circuit when the clock signal CLK2 is at a high level at a rising edge of the first latched output SD1, and FIG. 18 is a waveform diagram illustrating a clear signal of a clear circuit when the clock signal CLK2 is at a low level at a rising edge of the first latched output SD1. As illustrated in FIG. 17, when the clock signal CLK2 is at a high level at a rising edge of the first latched output SD1, the clear circuit outputs the clear signal between a half-period of the clock signal CLK2 and one period thereof. Because the clock signal CLK2 has a frequency of 200 MHz, the clear signal is outputted between 5 nsecs and 10 nsecs. The clear signal of the clear circuit is input to the first and second latch circuits R1 and R2, the first and second D-flip flop circuits F1 and F2 to clear them.

As described above, in the wideband wireless transmitter and receiver according to an embodiment of the present invention, although the transmitter does not generate exact pseudo random times of T1, T2, T3, and T4, it can perform a ultra-wideband wireless communication. Consequently, a counter of a digital circuit operating at high speed is required. Power consumption used to operate the counter is reduced.

Also, by inputting the clear signal to the first and second latch circuits R1 and R2 at a clock of 200 MHz, while the first and second latch circuits R1 and R2 maintain the latched signals SD1 and SD2, a multi-pass of one period (10 nsec) of a clock is eliminated. Furthermore, a clear is canceled prior to a half period (5 nsecs) at a clock of 200 MHz.

Hereinafter, an ultra-wideband transmitter and receiver according to the second embodiment of the present invention will be described with reference to the accompanying drawings.

Figure 19:
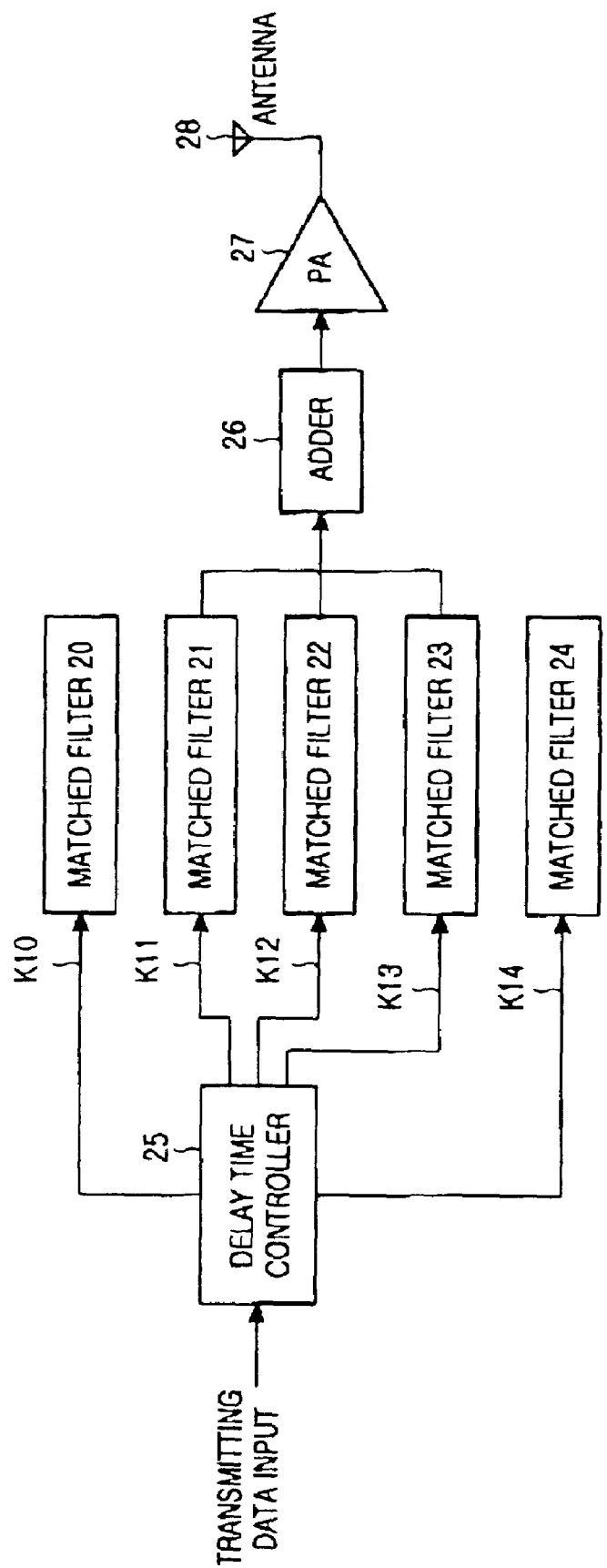
FIG. 19 is a view illustrating a configuration of an ultra-wideband transmitter according to a second embodiment of the present invention.

FIG. 19 is a view illustrating a configuration of a ultra-wideband transmitter according to a second embodiment of the present invention. The ultra-wideband transmitter includes first through fifth matched filters 20~24, a delay time controller 25, an adder 26, a PA 27, and an antenna section 28. The arrangement of FIG. 19 differs from that of FIG. 1 in that the ultra-wideband transmitter includes 5 matched filters rather than 3 matched filters according to the first embodiment.

Figure 20:
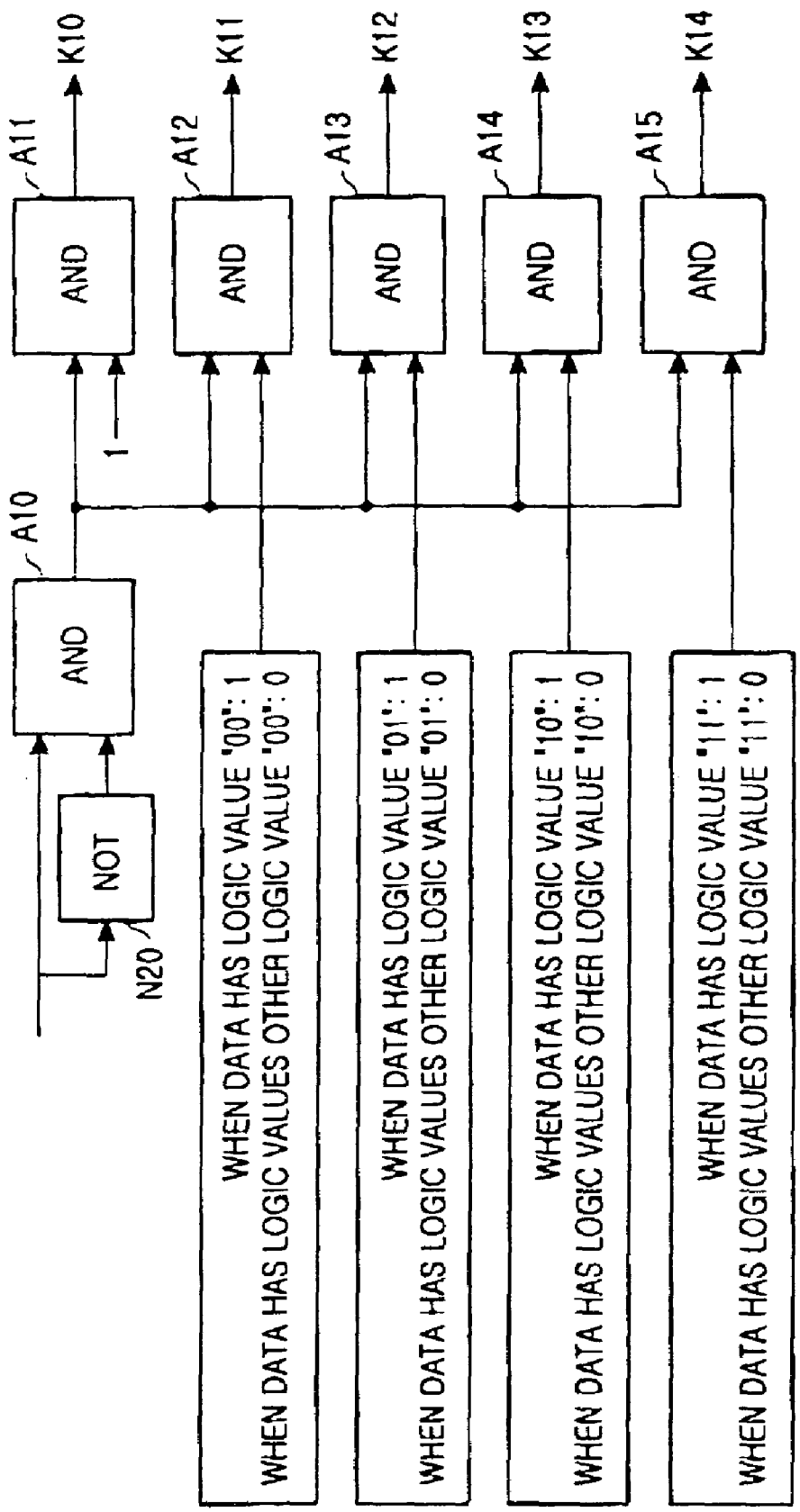
FIG. 20 is a view illustrating a view of details of the delay time controller 25 illustrated in FIG. 19.

FIG. 20 is a view illustrating a view of details of the delay time controller 25 illustrated in FIG. 19. The delay time controller 25 includes first through sixth AND circuits A10 A15 and an inverter N20. The inverter N20 receives and inverts a clock CLK of 100 MHz generated by a crystal oscillator (not illustrated) and outputs an inverted signal to the first AND circuit A10. The first AND circuit A10 ANDs the clock CLK and the inverted signal from the inverter N1 and generates a pulse as an output thereof.

The second AND circuit A11 ANDs the pulse from the first AND A10 and an input signal of logic value "1", and outputs an output signal K10 to the first matched filter 20. The third AND circuit A12 ANDs the pulse from the first AND circuit A10 and an input signal, and transmits an output signal K11 to the second matched filter 2. The input signal of the third AND circuit A12 has logic values "1" and "0" when the data to be transmitted has a logic value "00" and logic values other than the logic value "00", respectively.

The fourth AND circuit A13 ANDs the pulse from the first AND circuit A10 and an input signal, and transmits an output signal K12 to the third matched filter 22. The input signal of the fourth AND circuit A13 has logic values "1" and "0" when the data to be transmitted has a logic value "01" and logic values other than the logic value "01", respectively.

The fifth AND circuit A14 ANDs the pulse from the first AND circuit A10 and an input signal, and transmits an output signal K13 to the fourth matched filter 23. The input signal of the fifth AND circuit A14 has logic values "1" and "0" when the data to be transmitted has a logic value "10" and logic values other than the logic value "10", respectively.

The sixth AND circuit A15 ANDs the pulse from the first AND circuit A10 and an input signal, and transmits an output signal K14 to the fourth matched filter 24. The input signal of the sixth AND circuit A15 has logic values "1" and "0" when the data to be transmitted has a logic value "11" and logic values other than the logic value "11", respectively.

Figure 21:
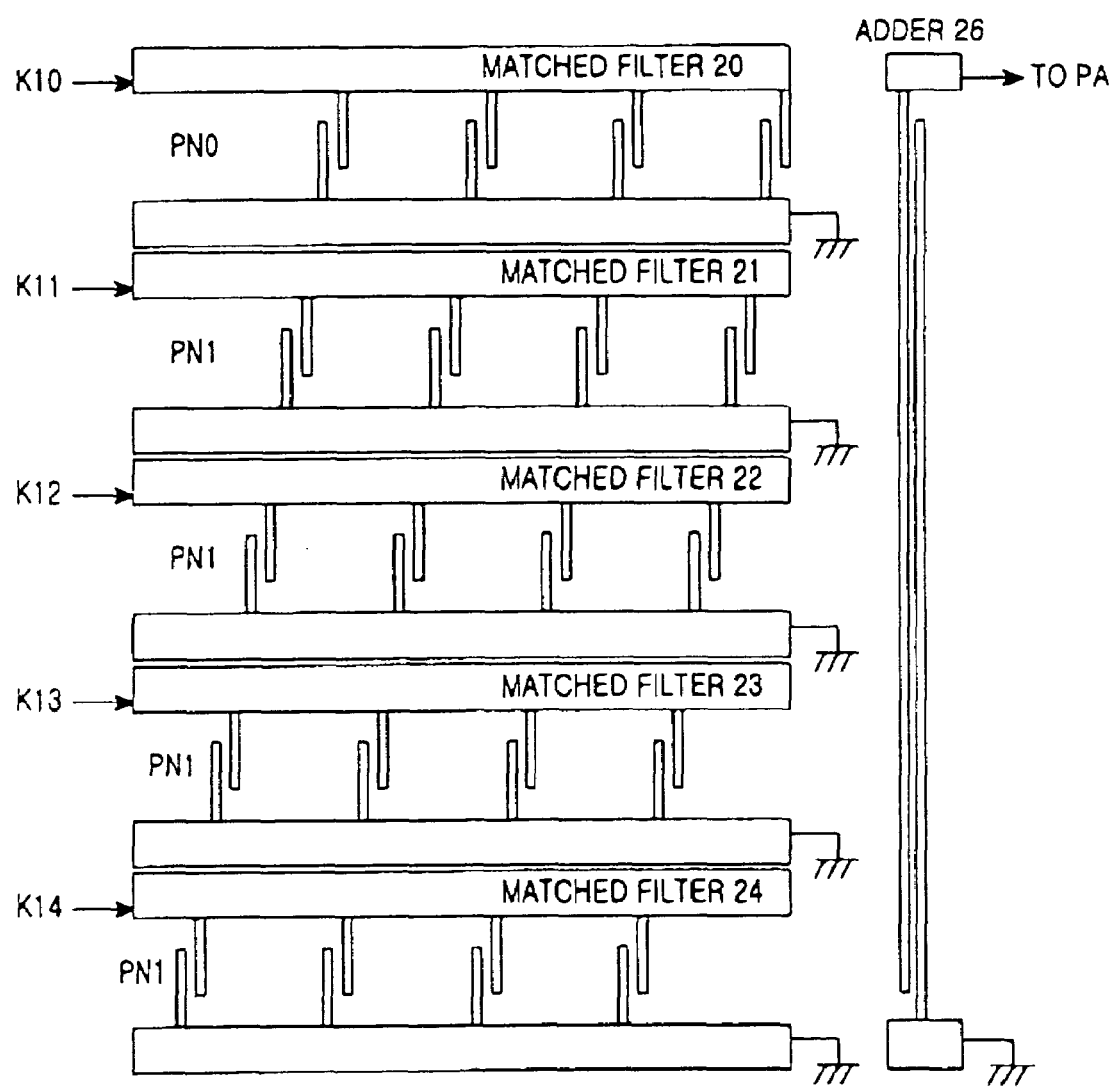
FIG. 21 is an enlarged detail illustrating each example of the first through fifth matched filters 20~24 and the adder 26 illustrated in FIG. 19.

FIG. 21 is an enlarged detail illustrating each example of the first through fifth matched filters 20~24 and the adder 26 illustrated in FIG. 19. Each of the first through matched filters 20~24 includes a SAW matched filter. The first matched filter 20 spreads an input signal K10 into a wideband by a spreading code PN0 which is a spreading code 0, and outputs a spread signal to the adder 26. The second through fifth matched filters 21~24 spread input signals K11~K14 into a wideband by a spreading code PN1 which is a spreading code 1, and outputs spread signals to the adder 26.

Figure 22:
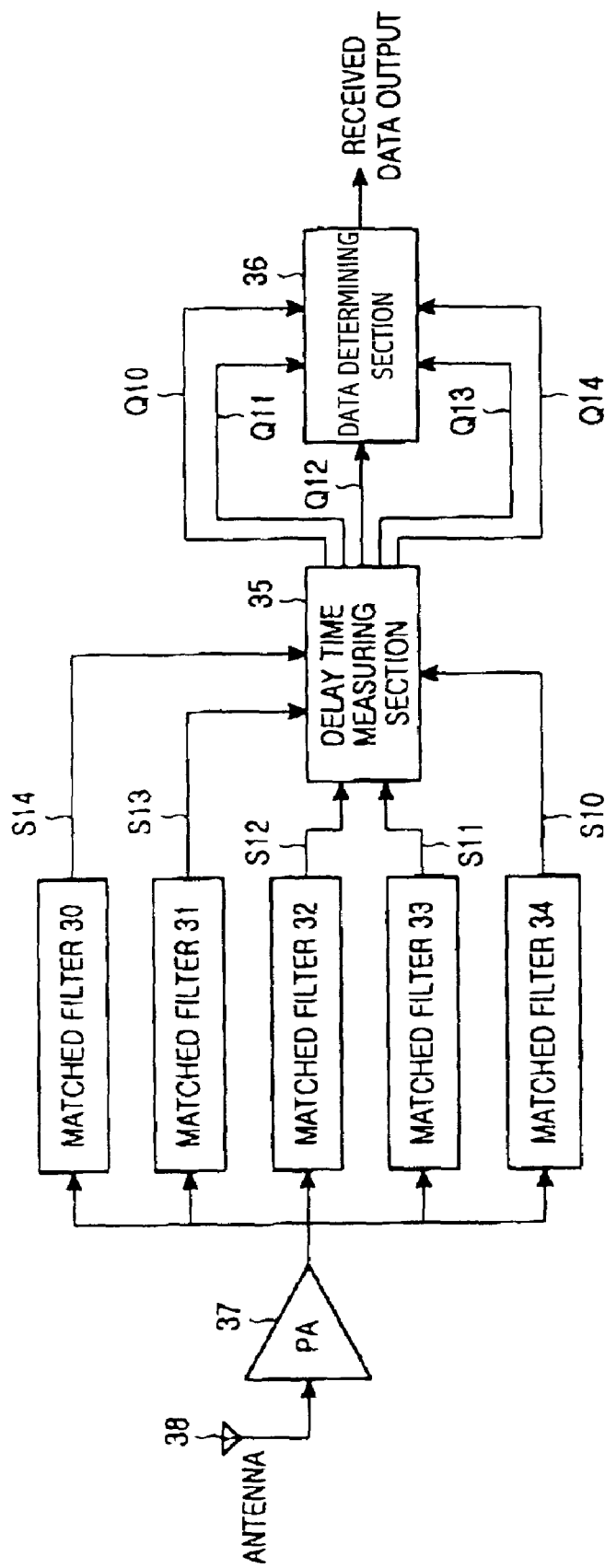
FIG. 22 is a view illustrating a configuration of an ultra-wideband wireless receiver according to a second embodiment of the present invention.

FIG. 22 is a view illustrating a configuration of an ultra-wideband wireless receiver according to a second embodiment of the present invention. The ultra-wideband wireless receiver includes first through fifth matched filters 30~34, a delay time measuring section 35, a data determining section 36, a PA 37, and an antenna section 38. The arrangement of FIG. 22 differs from that of FIG. 7 in that the ultra-wideband wireless receiver includes 5 matched filters rather than 2 matched filters according to the first embodiment.

Figure 23:
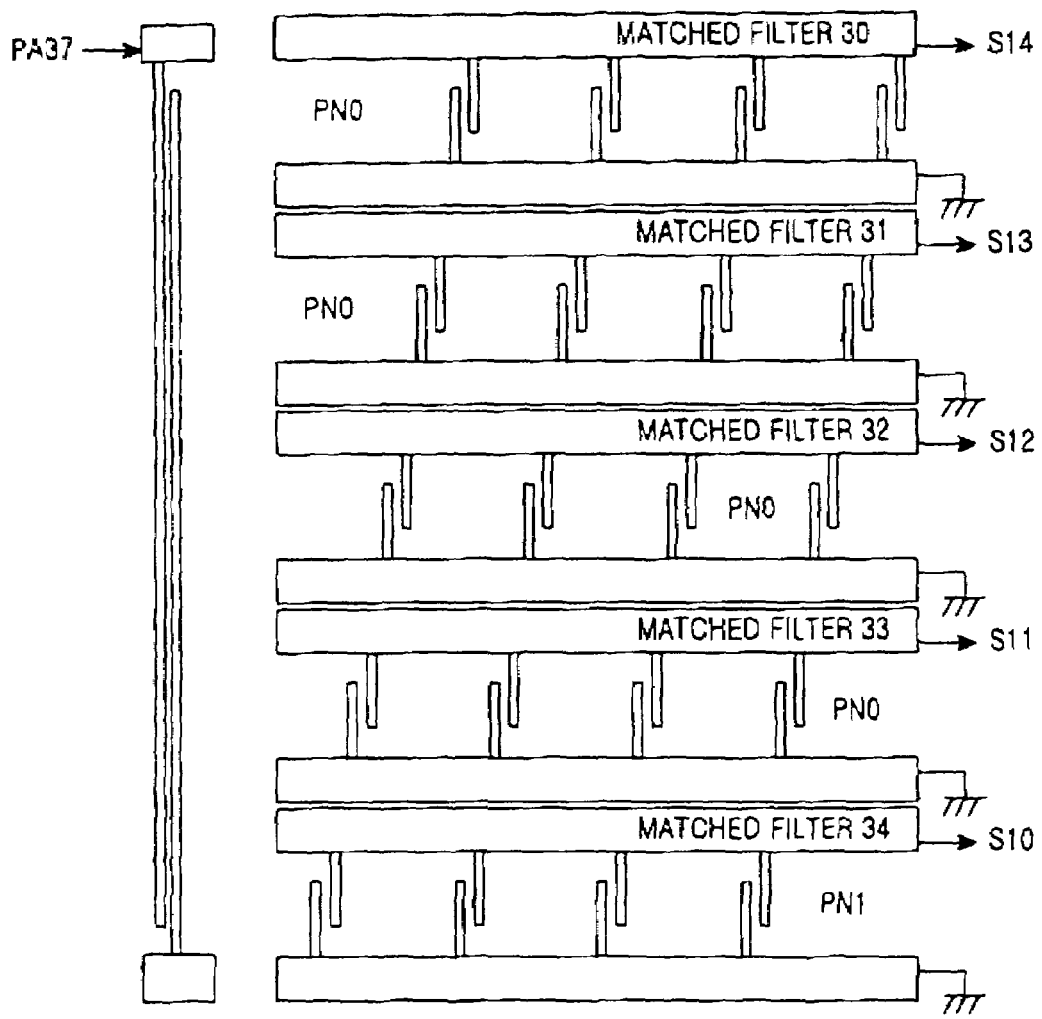
FIG. 23 is an enlarged detail illustrating configurations of the first through fifth matched filters 30~34 illustrated in FIG. 22.

FIG. 23 is an enlarged detail illustrating configurations of the first through fifth matched filters 30~34 illustrated in FIG. 22. Each of the first through fifth matched filters 30~34 includes the same SAW matched filter as the first and second matched filters 10 and 11 in the ultra-wideband transmitter. The first matched filter 30 resonates the amplified signal from the PA 14 at a spreading signal spread by a spreading code PN0 among the amplified signal, and outputs an output signal S14. The second matched filter 31 resonates the amplified signal from the PA 14 at a spreading signal spread by a spreading code PN0 among the amplified signal, and outputs an output signal S13. The third matched filter 32 resonates the amplified signal from the PA 14 at a spreading signal spread by a spreading code PN0 among the amplified signal, and outputs an output signal S12. The fourth matched filter 33 resonates the amplified signal from the PA 14 at a spreading signal spread by a spreading code PN0 among the amplified signal, and outputs an output signal S11. The fifth matched filter 34 inversely spreads an input spreading signal spread by a spreading code PN1 which is a spreading code, and outputs an output signal S10.

Figure 24:
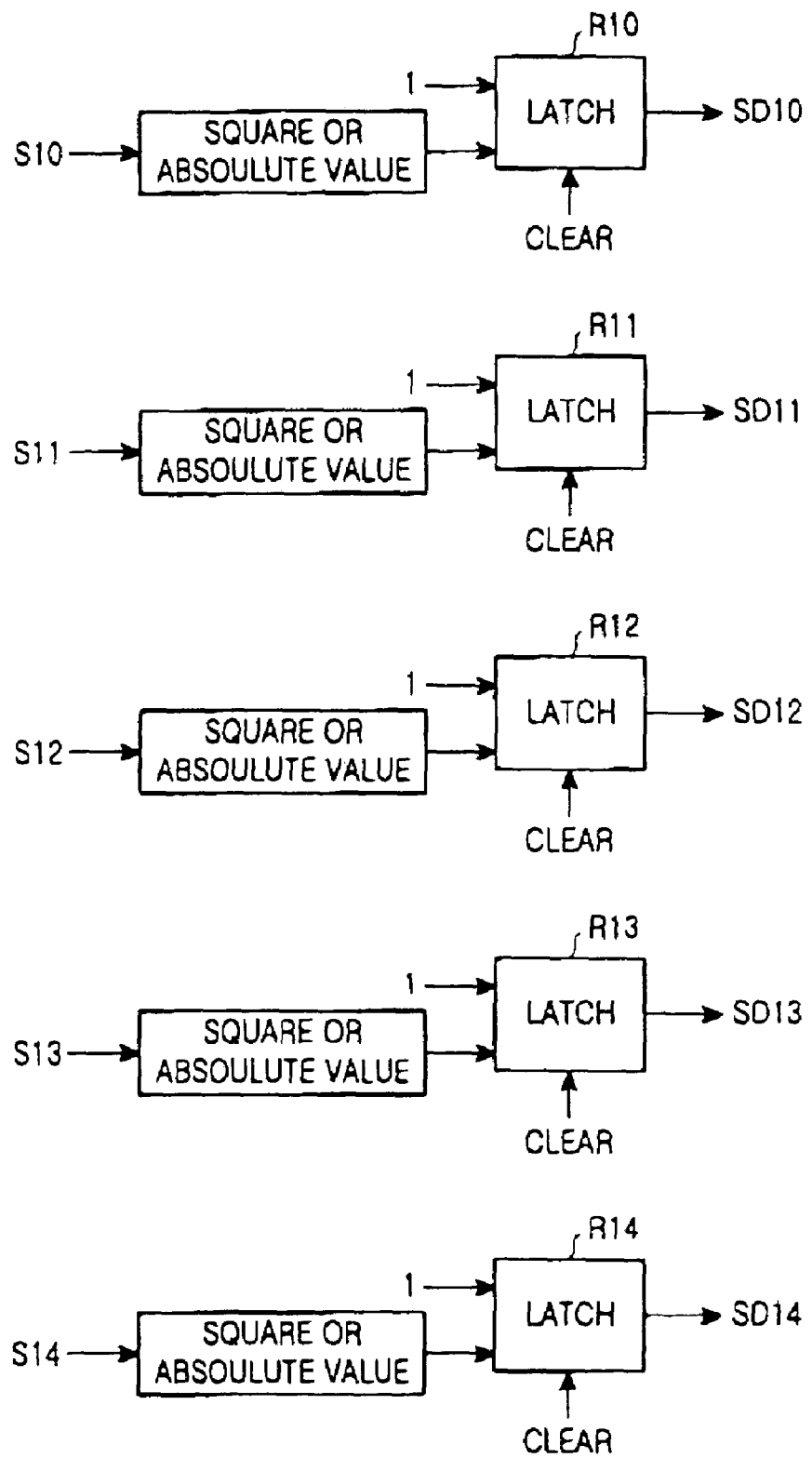
FIG. 24 is a view illustrating a configuration of first through fifth latch circuits R10~R14.
Figure 25:
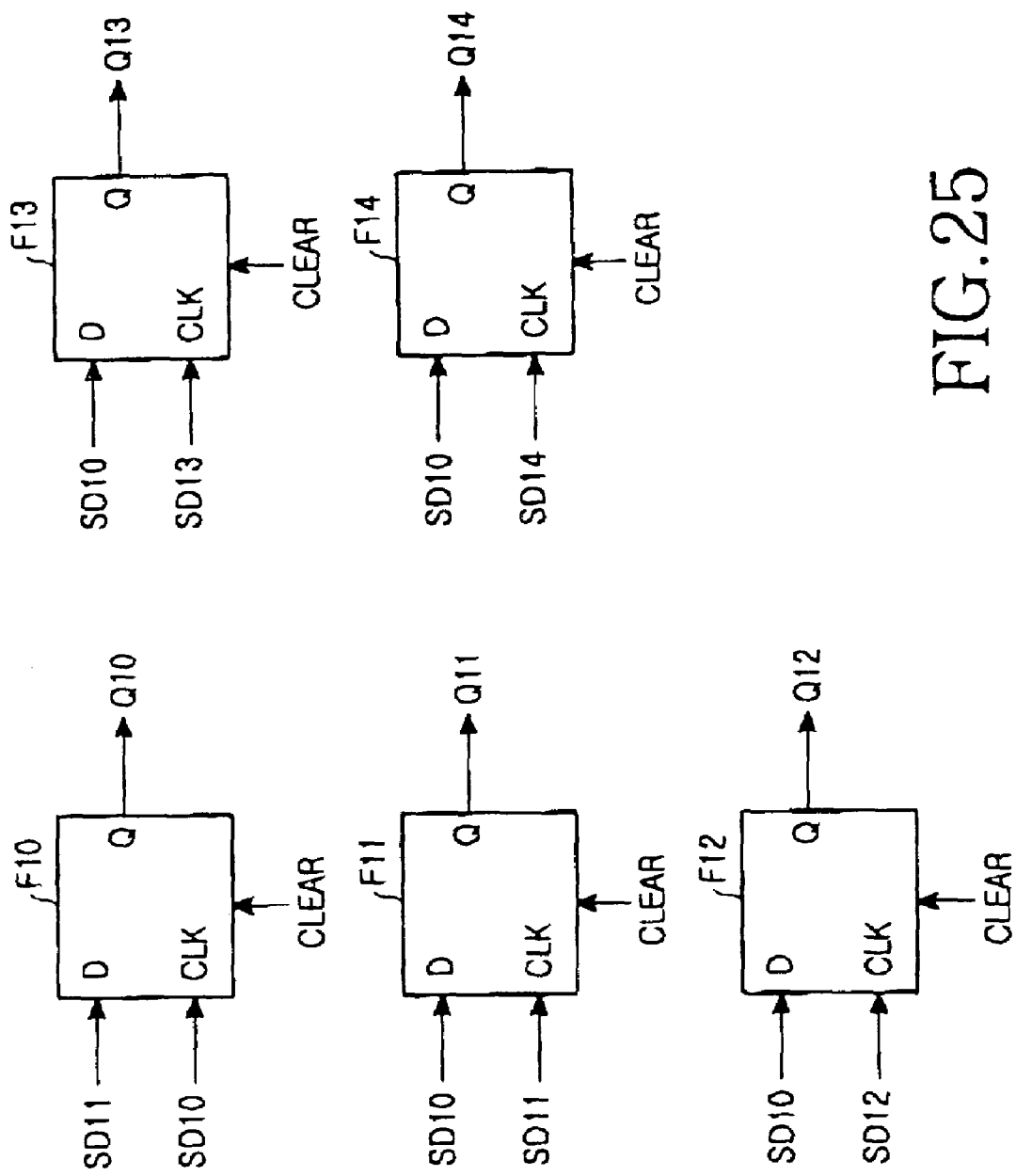
FIG. 25 is a view illustrating a configuration of first through fifth D-flip flop circuits F10~F14.

FIG. 24 is a view illustrating a configuration of first through fifth latch circuits R10~R14, and FIG. 25 is a view illustrating a configuration of first through fifth D-flip flop circuits F10~F14. The delay time measuring section 35 includes first through fifth latch circuits R10~R14 illustrated in FIG. 24, first through fifth D-flip flop circuits F10~F14 illustrated in FIG. 25, and a clear circuit.

In the same manner as the above-described latch circuits R1 and R2, the first latch circuit R10 receives the output signal S10 from the fifth matched filter 34, obtains a square or absolute value of the output signal S10. The first latch circuit R10 detects a signal intensity of the square or absolute value of the output signal S10. The first latch circuit R10 latches the output signal S10 and simultaneously outputs a first latched signal SD10 until a reset signal is input when the signal intensity of the square or absolute value of the output signal S10 exceeds a threshold value.

In the same manner as the first latch circuit R10, the second through fifth latch circuits R11~R14 receive the output signals S11~S14 from the matched filters 33, 32, 31, and 30, and obtain square or absolute values of the output signals S11~S14. The second through fifth latch circuits R11~R14 detect signal intensities of the square or absolute values of the output signals S11~S14. The second through fifth latch circuits R11~R14 latch the output signals S11~S14 and simultaneously output second through fifth latched signals SD11~S14 until a reset signal is input when each of the signal intensities of the square or absolute values of the output signals S11~S14 exceeds a threshold value.

The second latched signal SD11 and the first latched signal SD10 are input to a D terminal and a CLK terminal of the first D-flip flop circuit F10 illustrated in FIG. 25. When an input status of the CLK terminal of the first D-flip flop circuit F10 changes from a logic level "L" to a logic level "H", the first D-flip flop circuit F10 maintains an input status of the D terminal until a clear signal is input thereto and outputs an output signal Q10.

In addition, the first latched signal SD10 and the second latched signal SD11 are input to a D terminal and a CLK terminal of the second matched filter F11. The first latched signal SD10 and the third latched signal SD12 are input to a D terminal and a CLK terminal of the third matched filter F12. The first latched signal SD10 and the fourth latched signal SD13 are input to a D terminal and a CLK terminal of the fourth matched filter F13. The first latched signal SD10 and the fifth latched signal SD14 are input to a D terminal and a CLK terminal of the fifth matched filter F14. When each input status of the CLK terminals of the second through fifth matched filters F11~F14 changes from a logic level "L" to a logic level "H", the second through fifth matched filters F11~F14 maintain each input status of the D terminals thereof until the clear signal is input and output signals Q11~Q14, respectively.

FIG. 26 is a data determining table which is used for a data determination by a data determining section 36. The data determining section 36 performs a data determination based on the data determining table illustrated in FIG. 26. That is, in the above output signals Q11~Q14, when (Q10, Q11, Q12, Q13, Q14)=(1, 0, 1, 1, 1), the data determining section 36 determines that the data has a logic value (0, 0). When (Q10, Q11, Q12, Q13, Q14)=(1, 0, 0, 1, 1), the data determining section 36 determines that the data has a logic value (0, 1). When (Q10, Q11, Q12, Q13, Q14)=(1, 0, 0, 0, 1), the data determining section 36 determines that the data has a logic value (1, 0). When (Q10, Q11, Q12, Q13, Q14)=(1, 0, 0, 0, 0), the data determining section 36 determines that the data has a logic value (1, 1).

Hereinafter, in an operation of the ultra-wideband transmitter and receiver according to a third embodiment, a component different from that of the first embodiment of the present invention will be explained.

In the ultra-wideband transmitter illustrated in FIG. 19, a crystal oscillator generates a clock of 200 MHz. The clock of 200 MHz is divided into a clock of 100 MHz and input to the first AND circuit A10. The first AND circuit A10 receives the clock of 100 MHz and generates a pulse illustrated in FIG. 3 as an output. The generated pulse is input to the second AND circuit A11 and the output signal K10 of the second AND circuit A11 is input to the first matched filter 20. As illustrated in an upper part of FIG. 16, the first matched filter 20 receives the output signal K10 of the second AND circuit A11 and generates respective pulses at intervals of time 0, pseudo random times TM2, TM3, and TM4 from the reference time. Time axis is divided into a plurality of sections in such a manner that it has one section for every time period T in an upper part of FIG. 16. The reference time is illustrated by a dotted line in FIG. 16.

When the data to be transmitted are input to third through sixth AND circuits A12~A15, third through sixth AND circuits A12~A15 provide output signals K11~K14 to second through fifth matched filters 21~24, respectively. The second through fifth matched filters 21~24 receive the output signals K11~K14 of the third through sixth AND circuits A12~A15, respectively, generate respective pulses at intervals of time 0, pseudo random times TM2, TM3, and TM4 from the reference time. The time axis is divided into a plurality of sections in such a manner that it has one section for every time period T in an upper part of FIG. 16. The reference time is illustrated by a dotted line in FIG. 16.

At this time, the second matched filter 21 generates the pulse earlier than the first matched filter 20 by a predetermined time. The third matched filter 22 generates the pulse earlier than the second matched filter 21 by a predetermined time. The fourth matched filter 23 generates the pulse earlier than the third matched filter 22 by a predetermined time. The fifth matched filter 24 generates the pulse earlier than the fourth matched filter 23 by a predetermined time.

The adder 26 adds outputs of the first through fifth matched filters 20~24 to each other and the added signal to the PA 27. The PA 27 amplifies a level of the added signal from the adder 26 and outputs the amplified signal to the antenna section 28. The antenna section 28 radiates the amplified signal from the PA 27 into the air as an electronic wave.

In the ultra-wideband wireless receiver illustrated in FIG. 22, the antenna section 38 receives the electronic wave radiated from the antenna section 28 of the ultra-wideband transmitter, and outputs the electronic wave signal to the PA 37. The PA 37 amplifies a level of the electronic wave signal from the antenna section 38 and outputs the amplified signal to first through fifth matched filters 30~34. The first through fourth matched filters 30~33 resonate the amplified signal from the PA 37 at a spreading signal spread by a spreading code PN0 among the amplified signal, and output the output signals S11~S14. The fifth matched filter 34 resonates the amplified signal from the PA 37 at a spreading signal spread by a spreading code PN1 among the amplified signal, and outputs an output signal S10.

At this time, when the received data have a logic value (0, 0), an input spreading code is a reference signal. Because the data signal S10 is input later than the reference signal S11 and earlier than the reference signals S12~S14, the fifth matched filter 34 outputs the output signal S10 later than the output signal S11 which the fourth matched filter 33 outputs and earlier than the output signals S12~S14 which first through third matched filters 30~32 output, respectively.

When the received data has a logic value (0, 1), because the data signal S10 are input later than the reference signals S11 and S12 and earlier than the reference signals S13 and S14, the fifth matcher filter 34 outputs the output signal S10 later than the output signals S11 and S12 which the fourth and third matched filter 33 and 32 output, respectively, and earlier than the output signals S13 and S14 which first and second matched filters 30 and 31 output, respectively.

When the received data has a logic value (1, 0), because the data signal S10 are input later than the reference signals S11~S13 and earlier than the reference signal S14, the fifth matched filter 34 outputs the output signal S10 later than the output signals S11~S13 which the fourth, third, and second matched filters 33, 32, and 31 output, respectively, and earlier than the output signal S14 which the first matched filter 30 outputs.

When the received data has a logic value (1, 1), because the data signal S10 are input later than the reference signals S11~S14, the fifth matched filter 34 outputs the output signal S10 later than the output signals S11~S14 which the fourth, third, second, and first matched filters 30~33 output, respectively.

Figure 36:
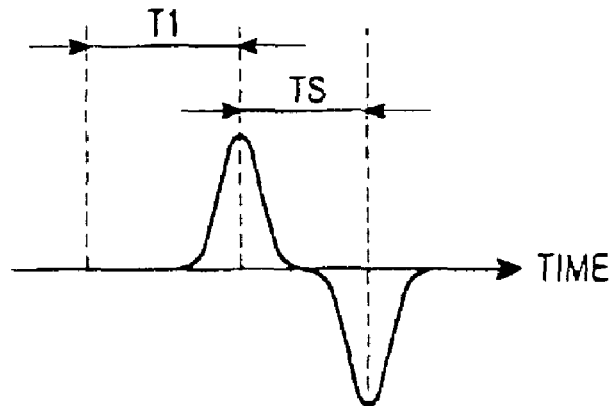
FIG. 36 is a view illustrating a waveform of a reference signal.
Figure 37:
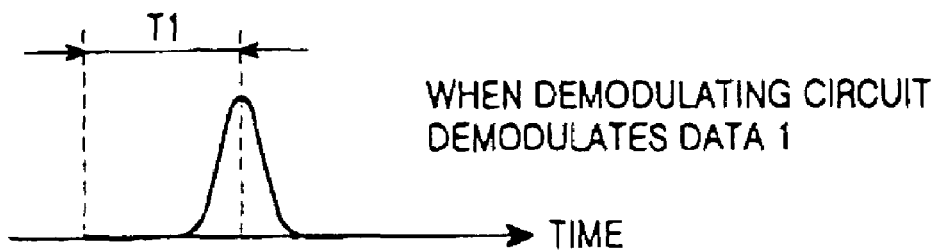
FIG. 37 is a waveform illustrating a multiplication result signal of the received signal and the reference signal when the demodulating circuit illustrated in FIG. 35 demodulates data 1.
Figure 38:
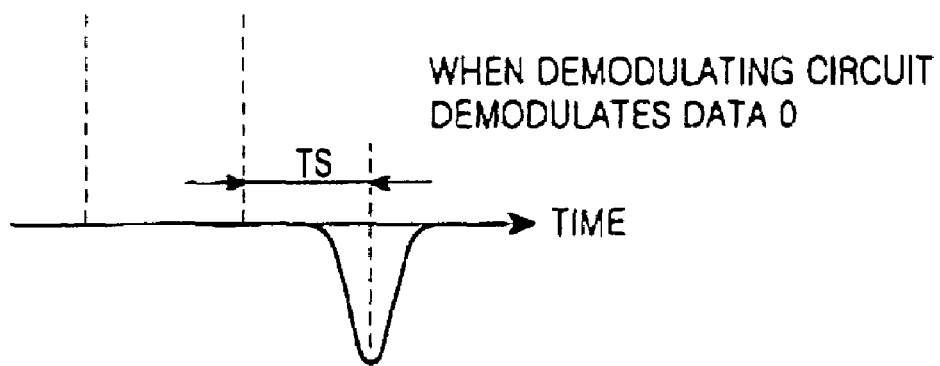
FIG. 38 is a waveform illustrating a multiplication result signal of the received signal and the reference signal when the demodulating circuit illustrated in FIG. 35 demodulates data 0.
Figure 39:
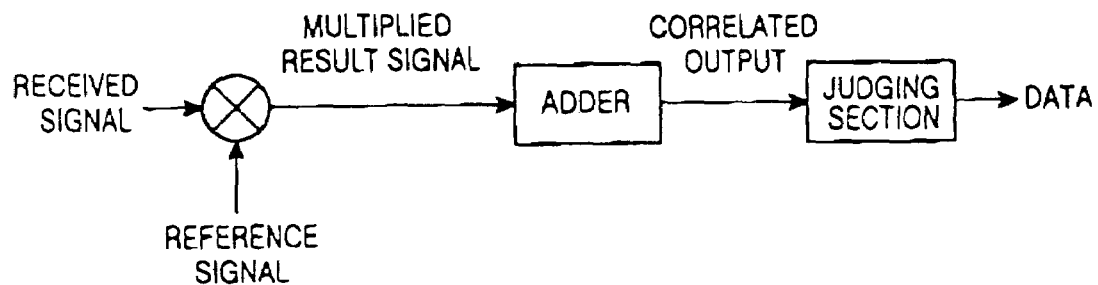
FIG. 39 is a view illustrating a configuration of a receiver when a plurality of pulses are added.
Figure 40:
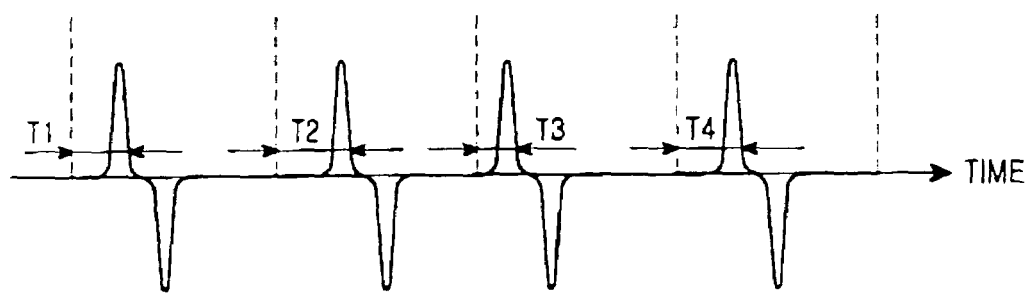
FIG. 40 is a view illustrating a waveform of a reference signal.
Figure 41:
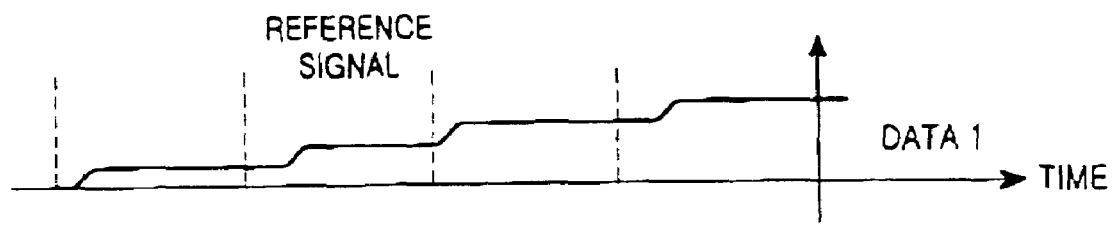
FIG. 41 is a view illustrating a time change of an output value when data is data 1.
Figure 42:
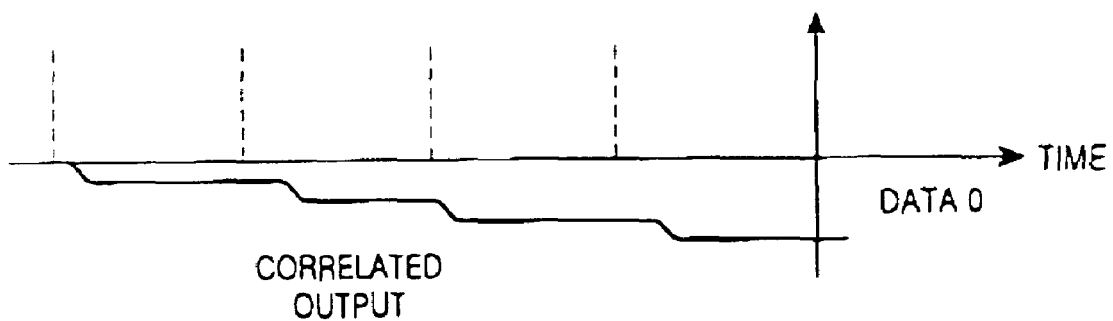
FIG. 42 is a view illustrating a time change of an output value when data is data 0.
Figure 43:
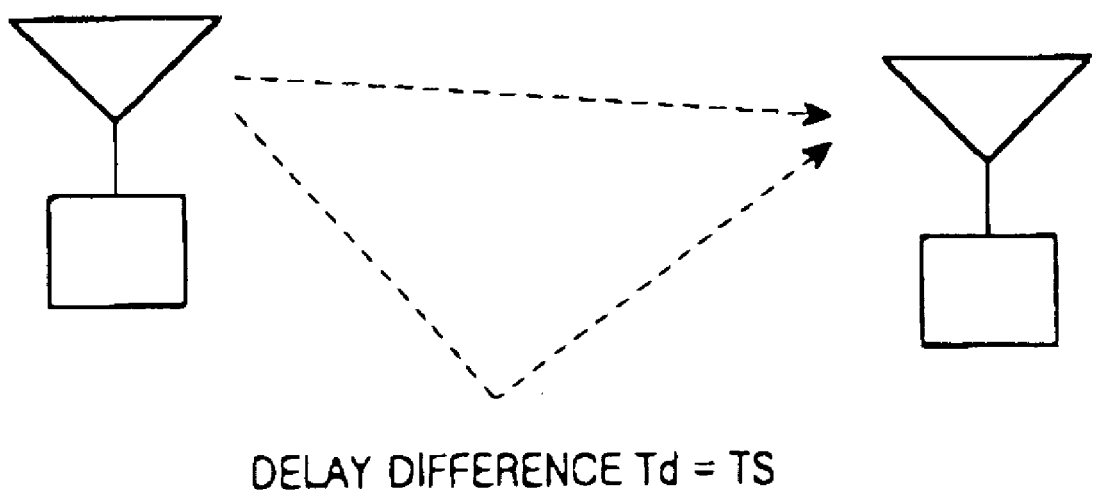
FIG. 43 is a view illustrating a transmitting status of signals when a multi-pass occurs.
Figure 44:
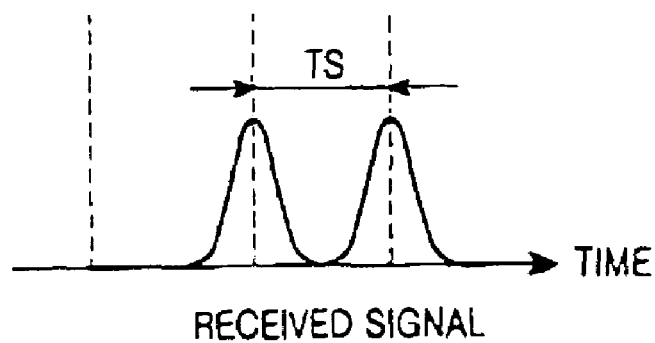
FIG. 44 is a view illustrating a received signal when a multi-pass occurs in data 1.
Figure 45:
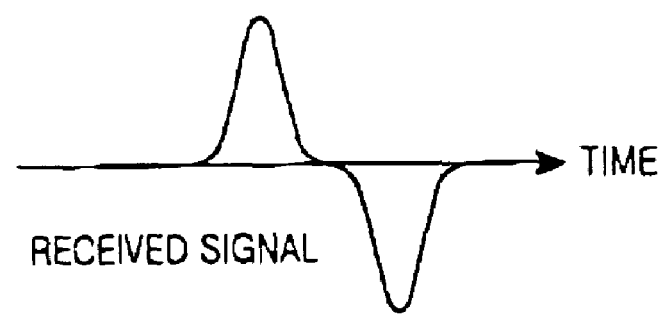
FIG. 45 is a view illustrating an output of a multiplier when a multi-pass occurs.

When the output signals S10~S14 of the fifth, fourth, third, second, and first matched filters 34, 33, 32, 31, and 30 are input to the delay time measuring section 35, the delay time measuring section 35 outputs the output signals Q10~Q14. The data determining section 36 receives the output signals Q10~Q14 of the delay time measuring section 35 and performs a data determination based on the data determining table illustrated in FIG. 36.

As described above, the ultra-wideband transmitter and receiver of the second embodiment of the present invention can transmit data by 4 combinations of (0, 0), (0, 1), (1, 0), and (1, 1). The second embodiment of the present invention can transmit double amount of data compared to the first embodiment of the present invention. That is, when a transmitting speed in the first embodiment of the present invention is 100 Mbp, that in the second embodiment of the present invention is 200 Mbp.

Figure 27:
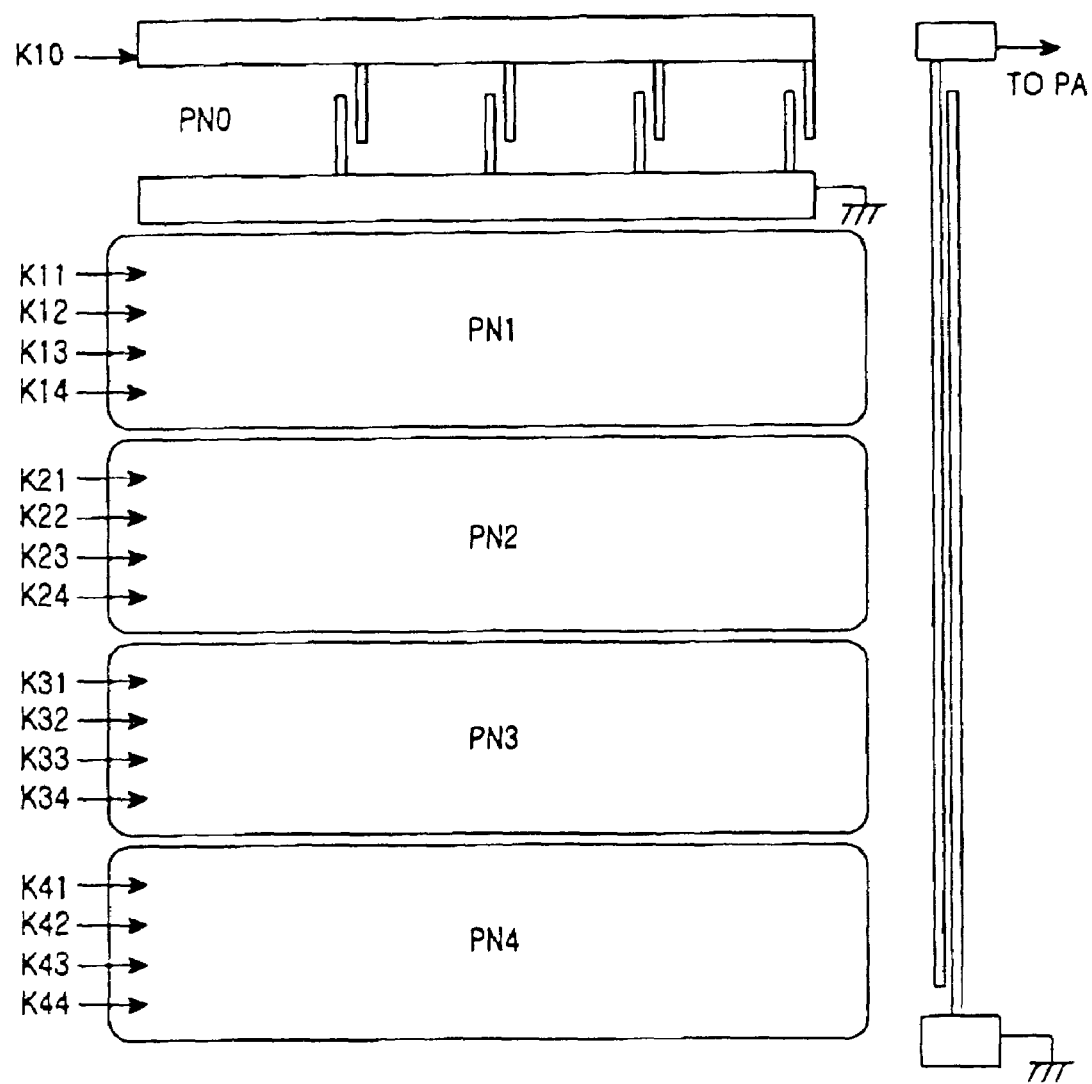
FIG. 27 is a view illustrating a configuration of a matched filter of an ultra-wideband transmitter according to a third embodiment of the present invention.

Hereinafter, the ultra-wideband transmitter and receiver according to a third embodiment of the present invention will be described with reference to FIGS. 27 through 31. FIG. 27 is a view illustrating a configuration of a matched filter of a ultra-wideband transmitter according to a third embodiment of the present invention. The arrangement of FIG. 27 differs from that of FIG. 19 in that the ultra-wideband transmitter includes 4 groups each having 4 matched filters 21~24, rather than the matched filters 21~24, and uses spreading codes PN2, PN3, and PN4. That is, the third embodiment includes 16 matched filters. Four matched filters according the third embodiment operate the same manner as the matched filters 21~24 according to the second embodiment.

Figure 28:
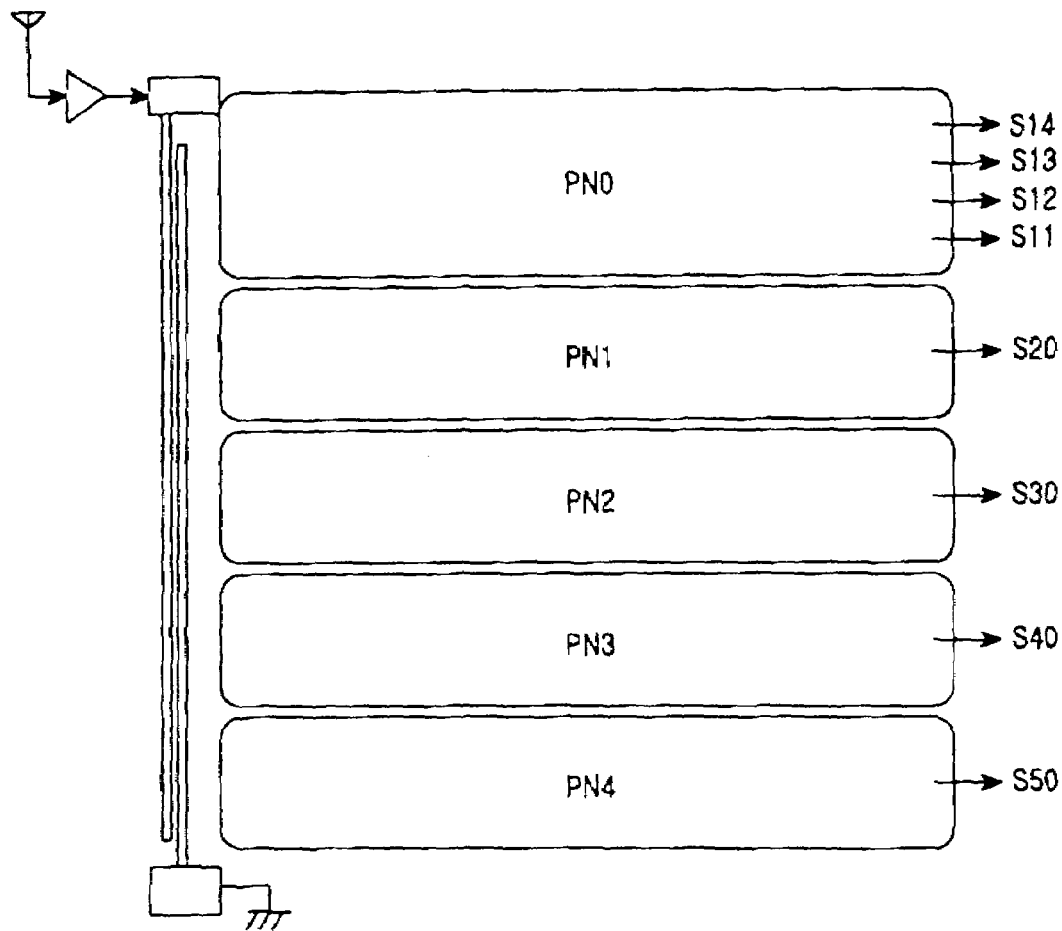
FIG. 28 is a view illustrating a configuration of a matched filter of an ultra-wideband wireless receiver according to a third embodiment of the present invention.
Figure 29:
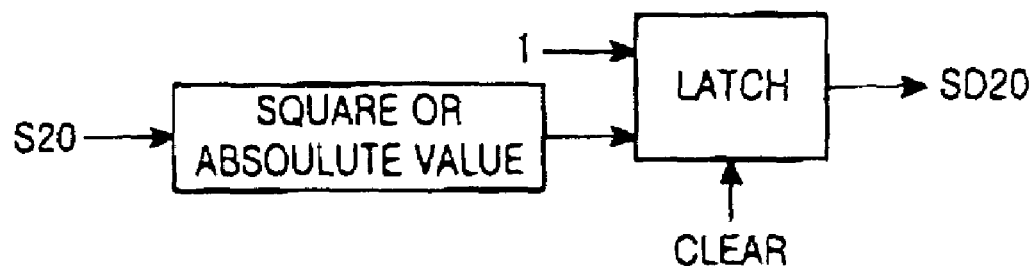
FIG. 29 is a view illustrating a configuration of a latch circuit.
Figure 29:
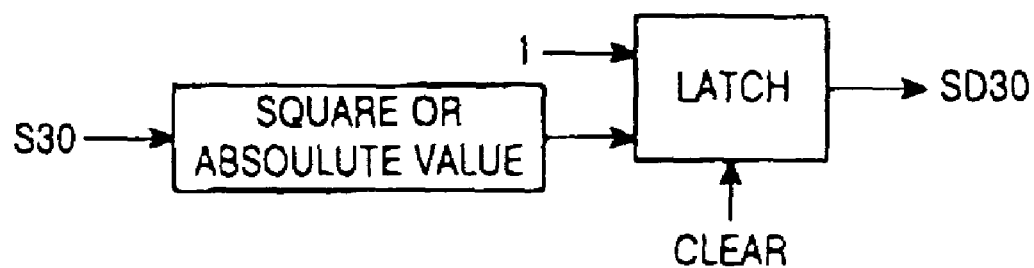
Figure 29:
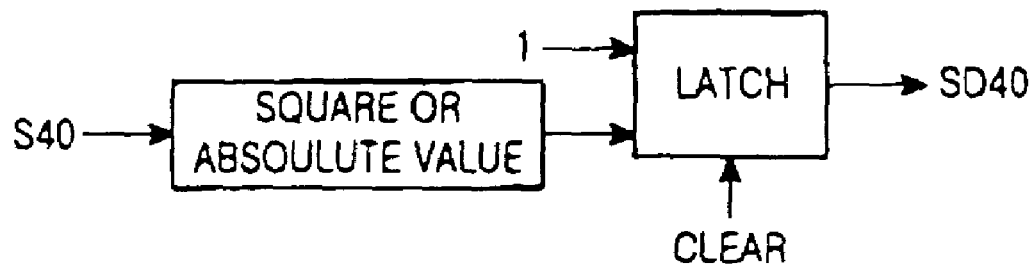
Figure 29:
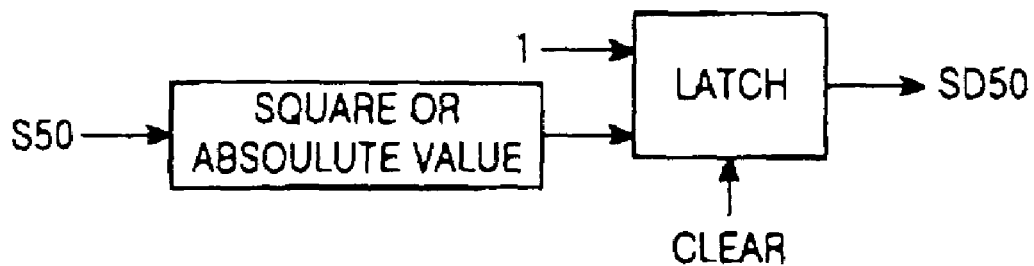

FIG. 28 is a view illustrating a configuration of a matched filter of a ultra-wideband wireless receiver according to a third embodiment of the present invention. The arrangement of FIG. 28 differs from that of FIG. 22 in that the ultra-wideband wireless receives spreading codes PN2, PN3, and PN4, rather than the matched filter 34 of PN1 according to the second embodiment. The ultra-wideband wireless receiver according to the third embodiment includes 8 matched filters. Matched filters PN2, PN3, and PN4 operate the same manner as the matched filter 34 according to the second embodiment.

The latch circuit receives output signals S20, S30, S40, and S50 of the matched filters PN2, PN3, and PN4 and obtains square or absolute values of the output signals S20, S30, S40, and S50. The latch circuit detects signal intensities of the square or absolute values of the output signals S20, S30, S40, and S50. The latch circuit latches the output signals S20, S30, S40, and S50 and simultaneously outputs latched signals SD20, SD30, SD40, and SD50 until a reset signal is input when each of the signal intensities of the square or absolute values of the output signals S20, S30, S40, and S50 exceeds a threshold value.

Figure 30:
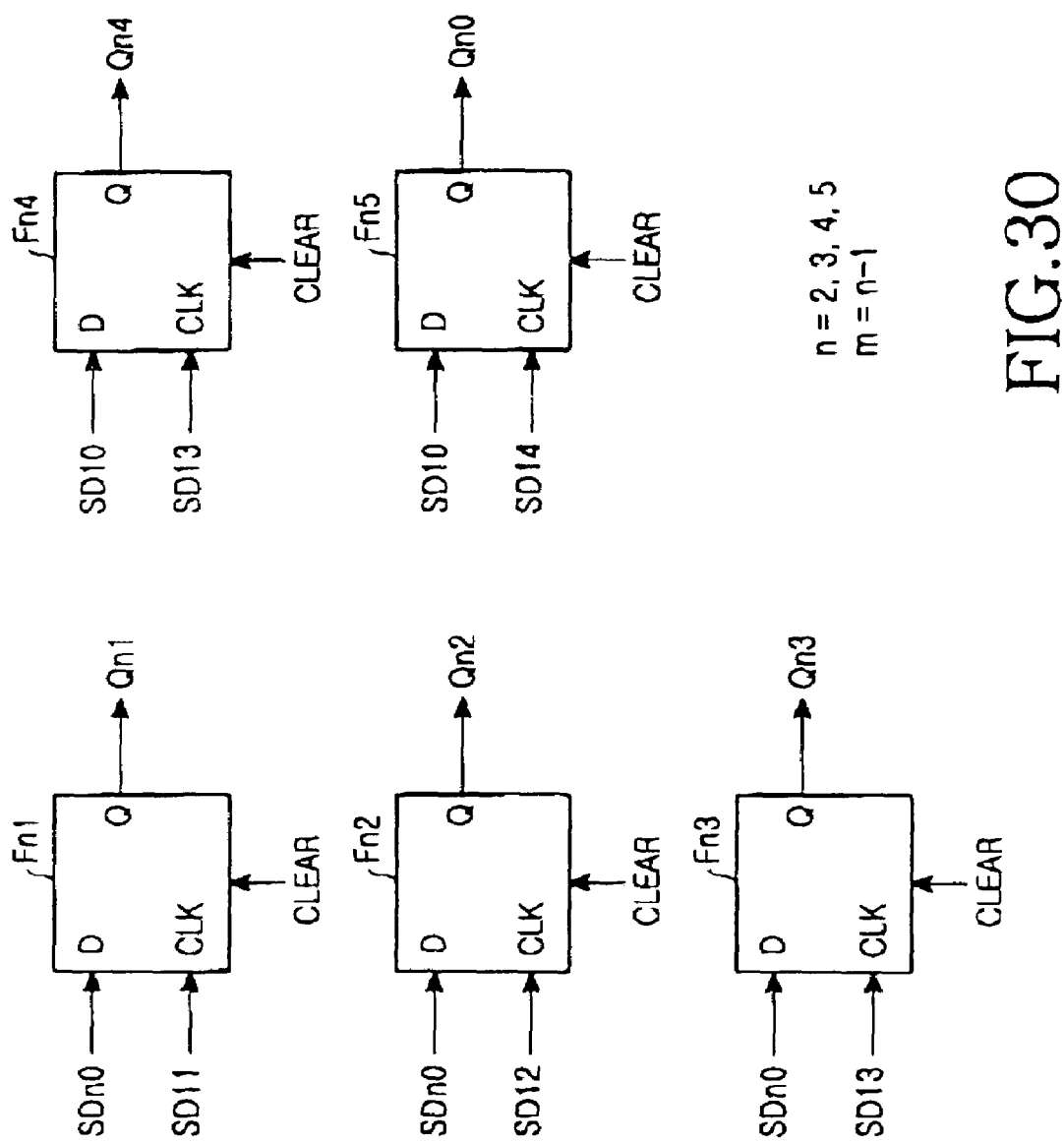
FIG. 30 is a view illustrating configurations of first through fifth D-flip flop circuits Fn0~Fn4.
Figure 32:
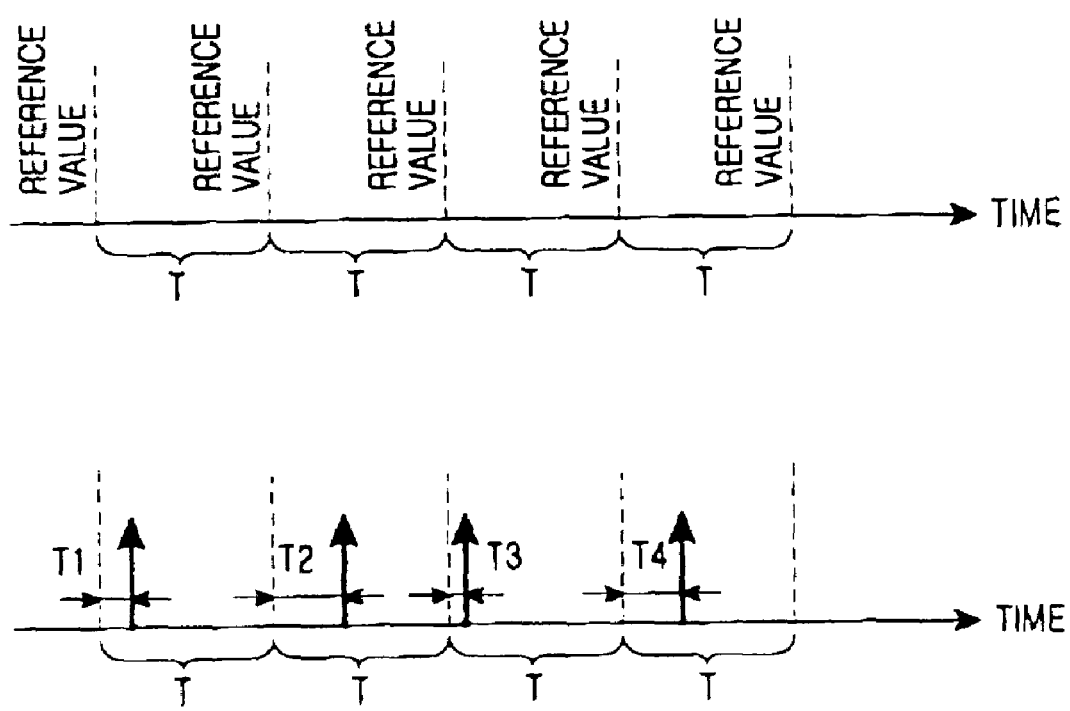
FIG. 32 is a view for illustrating an example of a time format of a signal exchange in the conventional ultra-wideband wireless transceiver.
Figure 33:
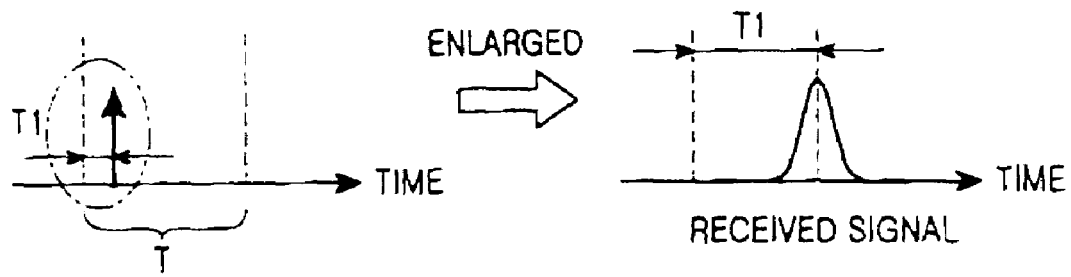
FIG. 33 is an enlarged view of a pulse generated at an interval of the pseudo random time T1 from the reference time.
Figure 34:
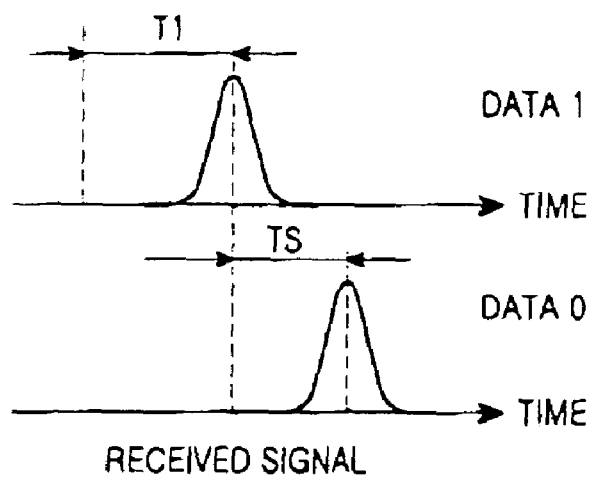
FIG. 34 is a view illustrating a relationship between data and a signal waveform.
Figure 35:
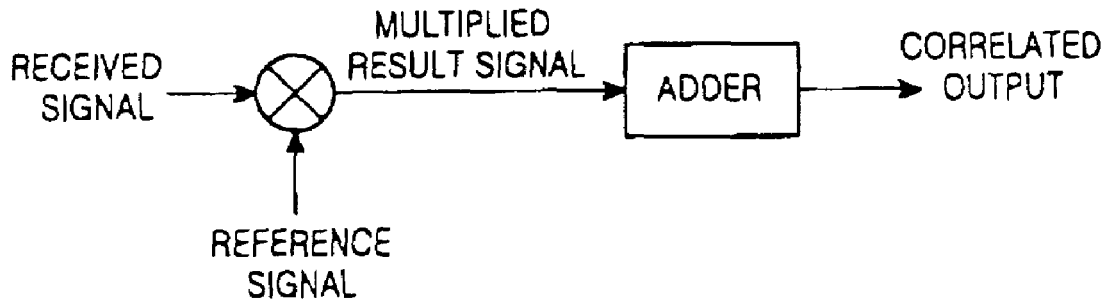
FIG. 35 is a block diagram illustrating a configuration of a demodulating circuit, which performs a data demodulation in a receiver.

The latched signal SDn0 and the latched signal SD11~14 are input to D terminals and CLK terminals of the D-flip flop circuit Fn1~Fn4 illustrated in FIG. 30. When an input status of each CLK terminal of the D-flip flop circuits Fn1~Fn4 changes from a logic level "L" to a logic level "H", the D-flip flop circuits Fn1~Fn4 maintain an input status of each D terminal until a clear signal is input thereto and output the output signal QN1~Qn4, where n=2, 3, 4, 5.

The latched signal SD1m and the latched signal SDn0 are input to a D terminals and a CLK terminal of the D-flip flop circuit Fn0 illustrated in FIG. 30. When an input status of a CLK terminal of the D-flip flop circuits Fn0 changes from a logic level "L" to a logic level "H", the D-flip flop circuit Fn0 maintains an input status of the D terminal until a clear signal is input thereto and outputs an output signal Qn0 (m=n−1).

FIG. 31 is a data determining table which is used for a data determination by a data determining section of the ultra-wideband wireless receiver according to a third embodiment of the present invention. The data determining section performs a data determination based on the data determining table based on FIG. 31.

More specifically, in the above output signals Qn0~Qn4, when (Qn0, Qn1, Qn2, Qn3, Qn4)=(1, 0, 1, 1, 1), the data determining section determines that the data has a logic value (0, 0, i), where i=n−2. When (Qn0, Qn1, Qn2, Qn3, Qn4)=(1, 0, 0, 1, 1), the data determining section determines that the data has a logic value (0, 1, i). When (Qn0, Qn1, Qn2, Qn3, Qn4)=(1, 0, 0, 0, 1), the data determining section determines that the data has a logic value (1, 0, i). When (Qn0, Qn1, Qn2, Qn3, Qn4)=(1, 0, 0, 0, 0), the data determining section determines that the data has a logic value (1, 1, i).

As described above, the ultra-wideband transmitter and receiver of the third embodiment of the present invention can transmit data by 4 combinations of (0, 0, i), (0, 1, i), (1, 0, i), (1, 1, i). The third embodiment of the present invention can transmit data four times quicker than the first embodiment of the present invention. That is, when a transmitting speed in the first embodiment of the present invention is 100 Mbp, that in the third embodiment of the present invention is 400 Mbp.

In addition, as described above, in the ultra-wideband transmitter, a delay time controller generates and inputs a periodic pulse to a first matched filter, outputting the periodic pulse to a second matched filter when data to be transmitted are at a first level of a binary logic level, and outputs the periodic pulse to a third matched filter when the data to be transmitted are at a second level of the binary logic level. The first matched filter receives the periodic pulse from the delay time controller and outputs a reference signal for data determination. The second matched filter receives the periodic pulse from the delay time controller and outputs a first data signal earlier than the reference signal by a predetermined time. The third matched filter receives the periodic pulse from the delay time controller and outputs a second data signal later than the reference signal by a predetermined time. An adder adds outputs of the first, second, and third matched filters to each other and outputs an added signal. An antenna section receives the added signal from the adder and radiates the received added signal into the air.

In the ultra-wideband wireless receiver, an antenna section receives and outputs an electronic wave signal to first and second matched filters. The first matched filter receives the electronic wave signal from the antenna section and outputs a first output signal when the first matched filter detects a reference signal for data determination. The second matched filter receives the electronic wave signal from the antenna section and outputs a second output signal when the second matched filter detects a data signal. A delay time measuring section detects which one is firstly outputted between the first or second output signal and outputs the detected result. A data determining section receives the detected result from the delay time measuring section and outputs predetermined data when the first output signal is input earlier than the second output signal, and outputs predetermined data when the second output signal is input earlier than the first output signal, so that a wireless ultra-wideband communication is performed without generating an exact pseudo random time.

Furthermore, a counter of a digital circuit operating at high speed is not required. Power consumption used to operate the counter is reduced.

Also, the delay time measuring section detects which one is firstly outputted between the first or second output signal and outputs the detected result. The data determining section receives the detected result form the time delay measuring section and outputs a reset signal. The data determining section receives the first and second output signals and detects the signal intensities of the first and second output signals. When each of the signal intensities of the first and second output signals exceeds a threshold value, the latched circuits latch the output signals until a reset signal is input.

Accordingly, while the latch circuits maintain the latched signals, that is until a clear signal is input to latch circuits, a multi-pass is eliminated.

While the invention has been illustrated and described with reference to certain preferred embodiments thereof, it will be understood by those skilled in the art that various changes in form and details may be made therein without departing from the spirit and scope of the invention as defined by the appended claims.

What is claimed is:

1. An ultra-wideband transmitter, comprising:
   a delay time controller for generating and inputting a periodic pulse to a first matched filter, outputting the periodic pulse to a second matched filter when data to be transmitted are at a first level of a binary logic level, and outputting the periodic pulse to a third matched filter when the data to be transmitted are at a second level of the binary logic level, wherein the first matched filter receives the periodic pulse from the delay time controller and outputs a reference signal for data determination, the second matched filter receives the periodic pulse from the delay time controller and outputs a first data signal earlier than the reference signal by a predetermined time, and the third matched filter receives the periodic pulse from the delay time controller and outputs a second data signal later than the reference signal by a predetermined time;
   an adder for adding outputs of the first, second, and third matched filters and outputting the added signal; and
   an antenna section for receiving the added signal from the adder and radiating the received added signal into the air.

2. The ultra-wideband transmitter according to claim 1, wherein each of the reference signal, the first data signal, and the second data signal is a pattern signal including a plurality of periodic pulses.

3. The ultra-wideband transmitter according to claim 1, further comprising an amplifier for amplifying the added signal from the adder and outputting the amplified signal to the antenna section.

4. An ultra-wideband wireless receiver comprising:
   an antenna section for receiving and outputting an electronic wave signal to first and second matched filters, wherein the first matched filter receives the electronic wave signal from the antenna section and outputs a first output signal when the first matched filter detects a reference signal for data determination, and the second matched filter receives the electronic wave signal from the antenna section and outputs a second output signal when the second matched filter detects a data signal;
   a delay time measuring section for detecting whether the first or second output signal is output first and outputting the detected result; and
   a data determining section for receiving the detected result from the delay time measuring section and determining whether the data signal is one of a first level and a second level of a binary logic level.

5. The ultra-wideband wireless receiver according to claim 4, wherein each of the reference signal and the data signal is a pattern signal including a plurality of periodic pulses.

6. The ultra-wideband wireless receiver according to claim 4, further comprising an amplifier for amplifying the wireless wave signal from the antenna section and outputting the wireless amplified wave signal to the first and second matched filters.

7. The ultra-wideband wireless receiver according to claim 4, wherein the delay time measuring section comprises:
   a first circuit for receiving the first output signal from the first matched filter and for calculating one of a square value and an absolute value of the first output signal; and
   a second circuit for receiving the second output signal from the second matched filter and for calculating one of a square value and an absolute value of the second output signal.

8. The ultra-wideband wireless receiver according to claim 4, wherein the delay time measuring section comprises:
   a first latch section for receiving and latching the first output signal from the first matched filter;
   a second latch section for receiving and latching the second output signal from the second matched filter;
   a first storage unit for receiving the first output signal from the first matched filter and reading the second output signal;
   a second storage unit for receiving the second output signal from the second matched filter and reading the first output signal; and
   a reset section for receiving the signal latched by one of the first and second latch section and outputting a reset signal.

9. An ultra-wideband transmitter comprising:
   a delay time controller for generating and inputting a periodic pulse to a first matched filter, outputting the periodic pulse to a second matched filter when first and second data to be transmitted are at a first level of a binary logic level, and outputting the periodic pulse to a third matched filter when the first data to be transmitted is at a first level of the binary logic level and the second data to be transmitted is at a second level of the binary logic level, outputting the periodic pulse to a fourth matched filter when the first data to be transmitted is at the second level of the binary logic level and the second data to be transmitted is at the first level of the binary logic level, and outputting the periodic pulse to a fifth matched filter when both of the first and second data to be transmitted are at the second level of the binary logic level, wherein the first matched filter receives the periodic pulse from the delay time controller and outputs a reference signal for data determination, the second matched filter receives the periodic pulse from the delay time controller and outputs a data signal earlier than the reference signal by a predetermined time, the third matched filter receives the periodic pulse from the delay time controller and outputs a data signal later than the reference signal by the predetermined time, the fourth matched filter receives the periodic pulse from the delay time controller and outputs a data signal later than the third matched filter by the predetermined time, and the fifth matched filter receives the periodic pulse from the delay time controller and outputs a data signal later than the fourth matched filter by the predetermined time;
   an adder for adding outputs for the first through fifth matched filters and outputting an added signal; and
   an antenna section for receiving the added signal from the adder and transmitting the received added signal into the air.

10. An ultra-wideband transmitter comprising:
    an antenna section for receiving and outputting a wireless wave signal to first through fifth matched filters, wherein the first matched filter receives the wireless wave signal from the antenna section and outputs a first output signal when the first matched filter detects a reference signal for data determination, the second matched filter receives the wireless wave signal from the antenna section and outputs a second output signal earlier than the first matched filter by a predetermined time when the second matched filter detects the reference signal, the third matched filter receives the wireless wave signal from the antenna section and outputs a third output signal earlier than the second matched filter by the predetermined time when the third matched filter detects the reference signal, the fourth matched filter receives the wireless wave signal from the antenna section and outputs a fourth output signal earlier than the third matched filter by the predetermined time when the fourth matched filter detects the reference signal, and the fifth matched filter for receiving the wireless wave signal from the antenna section and outputting a fifth output signal when the fifth matched filter detects a data signal;

a delay time measuring section for detecting whether the first or second signal is output first and outputting the detected signal; and a data determining section for receiving the detected result from the delay time measuring section and determining whether the data signal is a combination of a first level and a first level, the first level and a second level, the second level and the first level, or the second level and the second level, of a binary logic level.

11. An ultra-wideband wireless communication method for use with an ultra-wideband transmitter and receiver, the transmitter including a delay time controller, first through third matched filters, an adder, and a first antenna section, and the receiver including a second antenna section, fourth and fifth matched filters, a delay time measuring section, and a data determining section, the method comprising the steps of:

generating and inputting a periodic pulse to the first matched filter, outputting the periodic pulse to the second matched filter when data to be transmitted are at a first level of a binary logic level, and outputting the periodic pulse to the third matched filter when the data to be transmitted are at a second level of the binary logic level by the delay time controller;

receiving the periodic pulse from the delay time controller and outputting a reference signal for data determination by the first matched filter;

receiving the periodic pulse from the delay time controller and outputting a first data signal earlier than the reference signal by a predetermined time by the second matched filter;

receiving the periodic pulse from the delay time controller and outputting a second data signal later than the reference signal by the predetermined time by the third matched filter;

adding the outputs of the first, second, and third matched filters and outputting an added signal by the adder;

receiving the added signal from the adder and radiating the received added signal into the air by the first antenna section;

receiving and outputting the added signal to the fourth and the fifth matched filters by the second antenna section;

receiving the added wave signal from the second antenna section and outputting a first output signal when the fourth matched filter detects a reference signal for data determination by the fourth matched filter;

receiving the electronic wave signal from the second antenna section and outputting a second output signal when the fifth matched filter detects a data signal by the fifth matched filter;

detecting which of the first and second output signal is output first and outputting the detected result by the delay time measuring section; and receiving the detected result from the delay time measuring section and determining whether the data signal is a first level or a second level of a binary logic level by the data determining section.

12. The ultra-wideband wireless communication method according to claim 11, wherein each of the reference signal, the first data signal, and the second data signal is a pattern signal including a plurality of periodic pulses.

13. The ultra-wideband wireless communication method according to claim 11, further comprising amplifying the added signal from the adder and outputting the amplified signal to the first antenna by an amplifier of the ultra-wideband transmitter.

14. The ultra-wideband wireless communication method according to claim 11, further comprising amplifying the added signal from the second antenna and outputting the amplified signal to the fourth and fifth matched filters by an amplifier of the ultra-wideband wireless receiver.

15. The ultra-wideband wireless communication method according to claim 11, wherein the step of detecting which of the first and second output signal is output first comprises:

receiving the first output signal from the first matched filter and calculating a square value or an absolute value of the first output signal in a first circuit; and receiving the second output signal from the second matched filter and calculating a square value or an absolute value of the second output signal, in a second circuit.

16. The ultra-wideband wireless communication method according to claim 15, wherein the step of detecting which of the first and second output signal is output first further comprises:

receiving and latching the first output signal from the first matched filter in a first latch section;

receiving and latching the second output signal from the second matched filter in a second latch section;

receiving the first output signal from the first matched filter and reading the second output signal in a first storage unit;

receiving the second output signal from the second matched filter and reading the first output signal in a second storage unit; and receiving the signal latched by the first or second latch section and outputting a reset signal in a reset section.

* * * * *